(12) United States Patent
Ben

(10) Patent No.: US 11,105,442 B2
(45) Date of Patent: Aug. 31, 2021

(54) MOUNT FOR HOSE REEL

(71) Applicant: Schloss Ben, Belmont, CA (US)

(72) Inventor: Schloss Ben, Belmont, CA (US)

(*) Notice: Subject to any disclaimer, the term of this patent is extended or adjusted under 35 U.S.C. 154(b) by 0 days.

(21) Appl. No.: 16/528,498

(22) Filed: Jul. 31, 2019

(65) Prior Publication Data

US 2021/0033218 A1 Feb. 4, 2021

(51) Int. Cl.
 *F16L 3/00* (2006.01)
 *F16L 3/01* (2006.01)
 *B65H 75/44* (2006.01)

(52) U.S. Cl.
 CPC .......... *F16L 3/012* (2013.01); *B65H 75/4402* (2013.01); *B65H 75/4478* (2013.01)

(58) Field of Classification Search
 None
 See application file for complete search history.

(56) References Cited

U.S. PATENT DOCUMENTS

| | | | |
|---|---|---|---|
| 3,176,931 A | 4/1965 | Hannay | |
| 4,154,324 A | 5/1979 | Upton et al. | |
| 5,381,820 A * | 1/1995 | Chandler | B65H 75/441 137/355.16 |
| 5,657,789 A * | 8/1997 | Tisbo | B65H 75/22 137/355.27 |
| D492,578 S | 7/2004 | Evans et al. | |
| 6,834,813 B1 | 12/2004 | Nobl | |
| D505,612 S | 5/2005 | Evans et al. | |
| 6,926,027 B1 | 8/2005 | Sorensen | |
| 6,978,960 B2 | 12/2005 | Schaller | |
| 7,150,425 B2 | 12/2006 | Banaszkiewicz et al. | |
| D551,945 S | 10/2007 | Moldthan et al. | |
| D551,947 S | 10/2007 | Metzger | |
| D551,948 S | 10/2007 | Metzger | |
| 9,422,132 B1 * | 8/2016 | Pei | B65H 75/4492 |
| 2006/0102231 A1 | 5/2006 | Schiller et al. | |
| 2007/0102555 A1 * | 5/2007 | Franklin | B65H 75/4402 242/404 |
| 2009/0127370 A1 * | 5/2009 | Brown | B65H 75/4463 242/397.2 |
| 2012/0061540 A1 * | 3/2012 | Platt | F16B 45/00 248/225.21 |
| 2012/0292419 A1 | 11/2012 | Shakal | |
| 2019/0248621 A1 * | 8/2019 | Tracey | B65H 75/4486 |

OTHER PUBLICATIONS

L.K. Goodwin Co. Material Handling Equipment; Series D9000/E9000 Vehicle Mount Hose Reels; web page, https://www.lkgoodwin.com/more_info/series_e9000_large_frame_reels/series_e9000_large_frame_reels.shtml; downloaded Sep. 30, 2016.

* cited by examiner

*Primary Examiner* — Steven M Marsh
(74) *Attorney, Agent, or Firm* — James R. Cypher; Charles R. Cypher

(57) ABSTRACT

A connection between a hose reel and an anchoring support, with an L-shaped mounting bracket attached to the anchoring support, the L-shaped mounting bracket having an extension flange and a mounting flange disposed at an angle to the extension flange with the mounting flange being connected to the anchoring support, and the frame attached to the mounting bracket with the frame supporting the hose reel in a manner that allows the hose reel to rotate with respect to the frame.

25 Claims, 31 Drawing Sheets

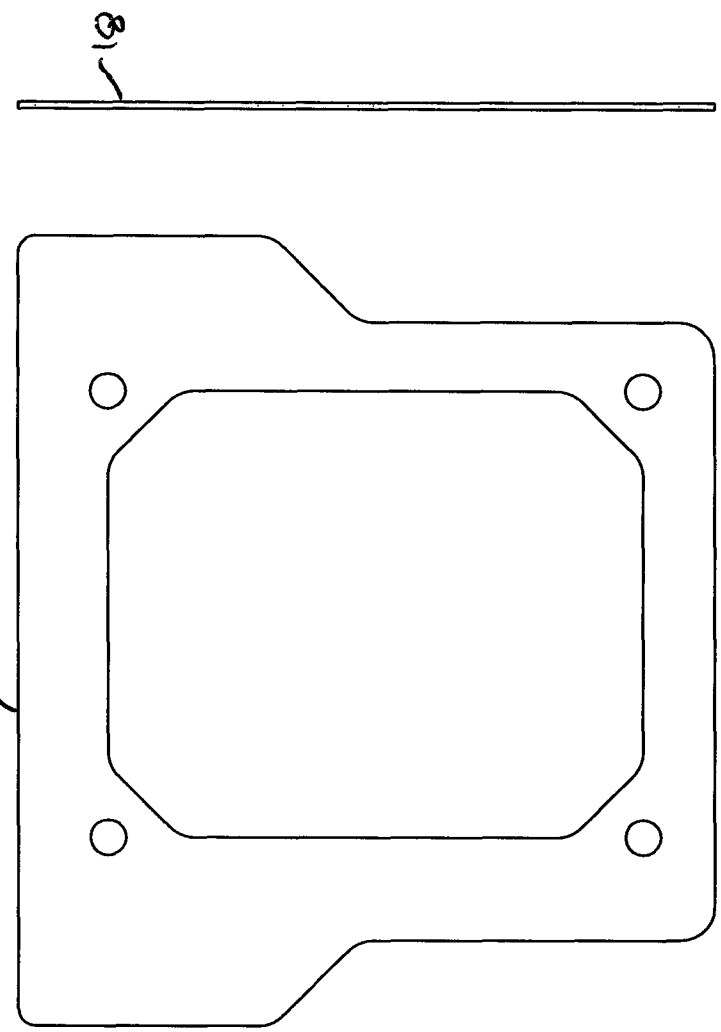
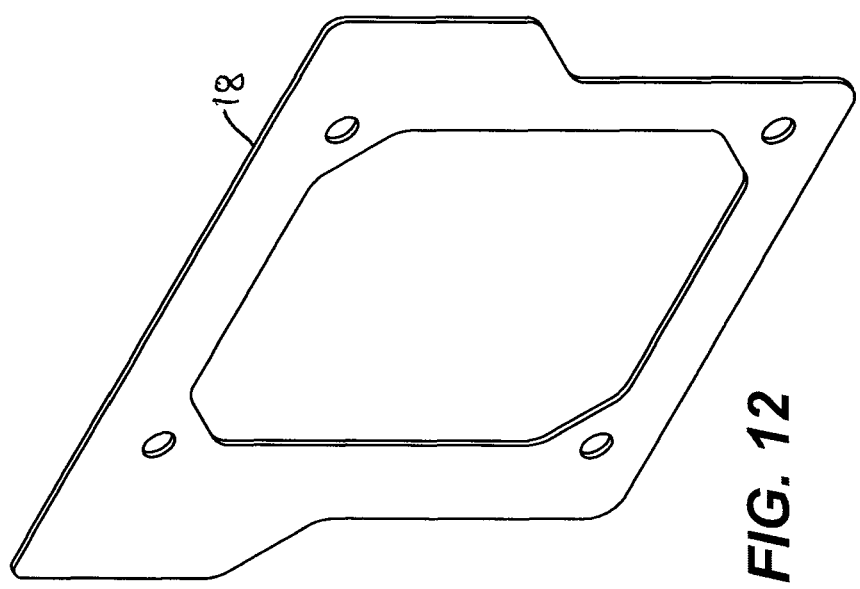
FIG. 12
FIG. 13
FIG. 14
FIG. 15
FIG. 16

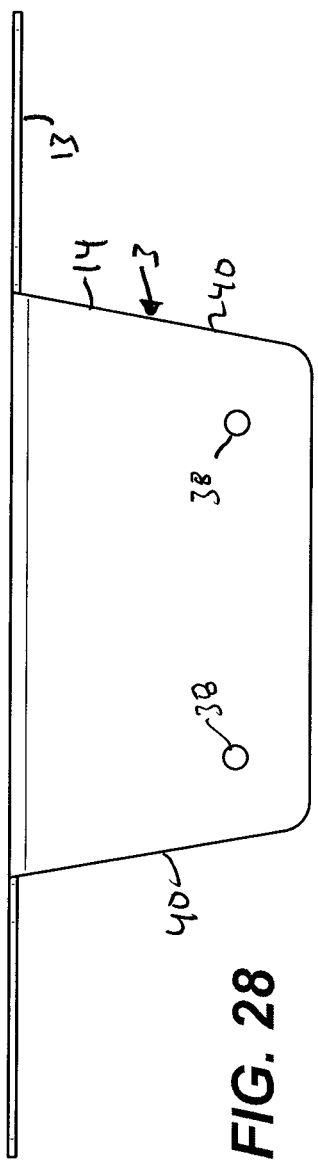
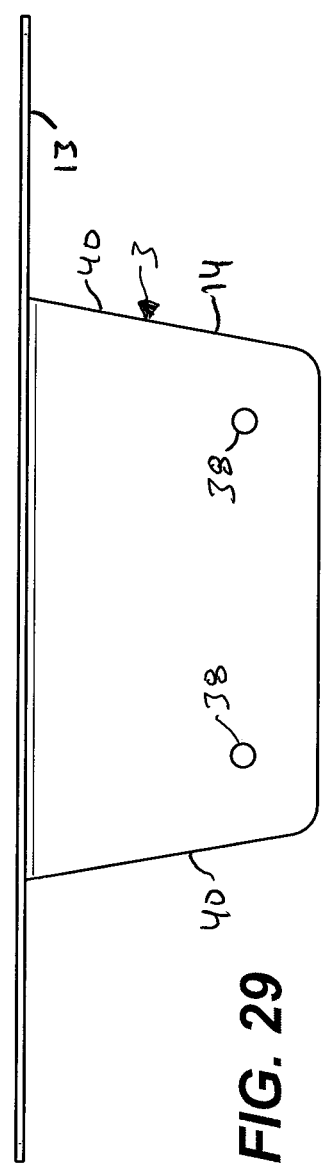
FIG. 28
FIG. 29

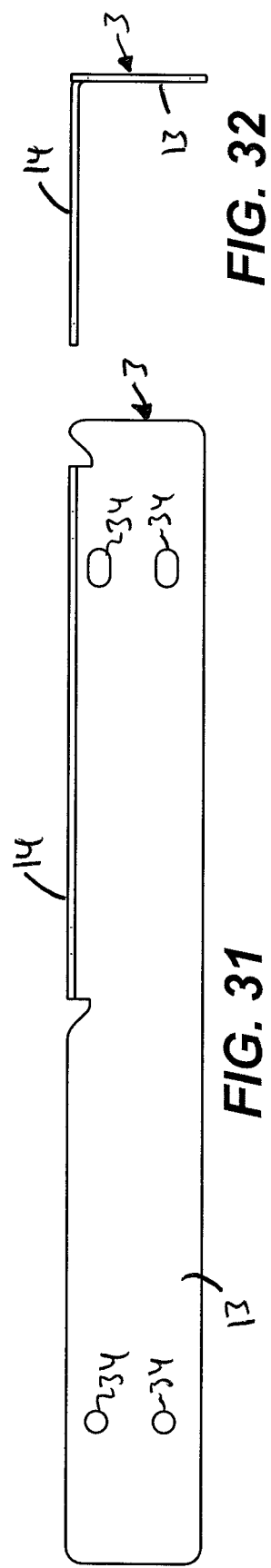
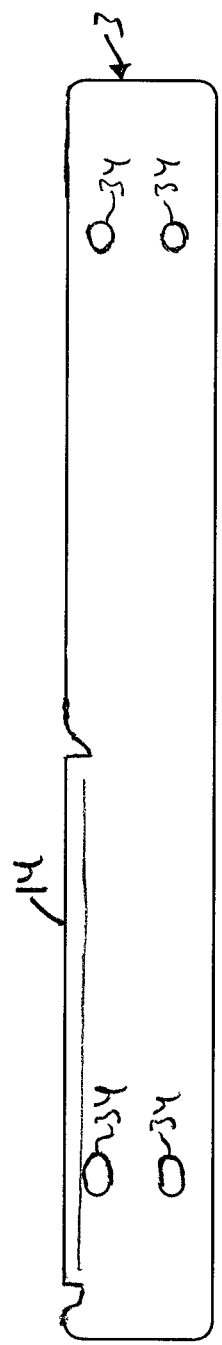
FIG. 31
FIG. 32
FIG. 33

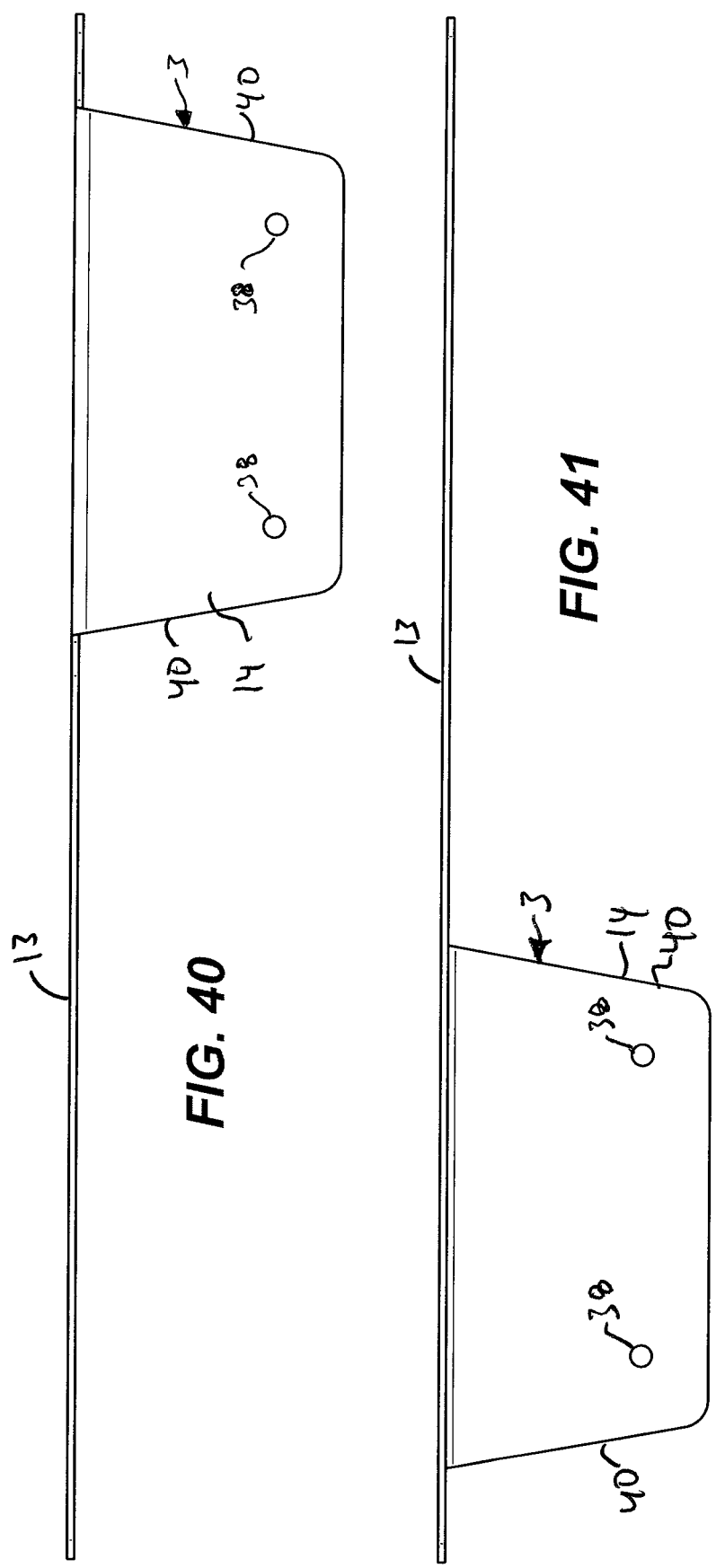

MOUNT FOR HOSE REEL

BACKGROUND

The present invention relates generally to hose reels, and more particularly to frames and brackets for mounting hose reels on objects.

Hose reels are commonly used to consolidate fluid-carrying hoses. The fluid can be a liquid or gas or the hose could be a conduit for carrying an electric charge. Hoses take up less space when wound on a reel or spool, and are more easily deployed and stored. U.S. Pat. Nos. 4,154,324, 6,978,960, and 7,150,425 teach hose reels and the contents of these patents are incorporated herein by reference.

The main component of a hose reel is the spool on which the hose is wound. The spool typically includes a generally cylindrical hub with first and second side walls at the ends of the hub extending outwardly therefrom to create an annular retaining area for the hose. The spool can include a mount for the hose. An inlet end of the hose attaches to a fluid exit connector on the mount. The mount also has a fluid inlet connector for receiving a fluid source attachment. The hose is partially anchored to the spool by the fluid exit connector on the mount. One or more additional mechanisms, if needed, can be used to anchor the hose to the spool so that as the spool spins in the retraction direction for the hose, the hose is wound onto the spool. The spool can also have a mechanism in the form of a torsion spring or a counter-weight to make it easier to wind the hose on the reel. The spool can also have a ratcheting latch assembly to prevent the hose reel from retracting the hose when the hose is in use. These latch assemblies typically include a rotating toothed ratchet on the spool that can engage and disengage with a fixed pawl that does not rotate with the spool.

Typically, the spool is attached to a frame in a manner that allows the spool to rotate with respect to the frame. The frame can be portable and be designed to be held in place during use by a number of different mechanisms. For example, the user could place the frame on the ground and then press their weight down on the frame in order to create enough friction force to hold the frame and spool in place while an extended hose is wound back onto the frame. Alternatively, the frame can be anchored to another member that is unlikely to move while the hose is wound onto or unwound from the spool of the hose reel.

The frame may attach to one or both sides of the spool. The frame needs to be able to support the weight of a hose containing liquid wound on the spool as well as withstand the strains that come from winding and unwinding the hose from the spool.

Hose reels are often used with a guide that directs the spooling of the hose onto the spool. The guide restricts the angles at which the hose approaches the spool. This helps to make sure the hose coils properly on the spool. The guide is usually fixed with respect to the spool during the winding and unwinding operations.

SUMMARY OF THE INVENTION

It is an object of the present invention to provide a mounting bracket and a frame for connecting a hose reel to an anchoring support such as a tool box.

The mounting bracket and frame are constructed so that the frame can hang downwardly from the extension flange of the mounting bracket or the frame can extend upwardly from the extension flange of the mounting bracket.

The mounting bracket and frame are constructed so that the frame interfaces with the mounting bracket at multiple locations so as to create a stable connection between the mounting bracket and the frame.

The mounting bracket and frame are constructed so that the frame can receive a portion of the mounting bracket in a slot.

The mounting bracket and frame are constructed so that one frame can work with a number of differently shaped mounting brackets.

The frame is constructed so that a guide can be attached at either end of the frame. This allows for different mounting orientations of the frame with respect to the anchoring support.

In one embodiment of the invention, the mounting bracket is provided with a long, downwardly extending mounting flange so that the hose reel can be located remotely from the anchoring fasteners and low down on a rolling tool box so as to avoid causing the tool box to tip over.

It is also an object of the invention to provide mounting brackets, a frame and a decorative plate of unique configurations.

BRIEF DESCRIPTION OF THE DRAWINGS

FIG. 4 is a sectional view of the mounting bracket and the frame taken from the front of each. The anchoring fasteners attaching the mounting bracket to the anchoring support are shown.

FIG. 12 is a perspective view of the decorative plate.

FIG. 13 is a front view of the decorative plate of FIG. 12. The back view is the same.

FIG. 14 is a right side view of the decorative plate of FIG. 12. The left side view is the same.

FIG. 15 is a top view of the decorative plate of FIG. 12.

FIG. 16 is a bottom view of the decorative plate of FIG. 12.

FIG. 28 is a top view of the mounting bracket of FIG. 24.

FIG. 29 is a bottom view of the mounting bracket of FIG. 24.

FIG. 31 is a front view of the mounting bracket of FIG. 30.

FIG. 32 is a right side view of the mounting bracket of FIG. 30. The left side view is the same.

FIG. 33 is back view of the mounting bracket of FIG. 30.

FIG. 40 is a top view of the mounting bracket of FIG. 36.

FIG. 41 is a bottom view of the mounting bracket of FIG. 36.

DETAILED DESCRIPTION OF THE INVENTION

Figure 1A:
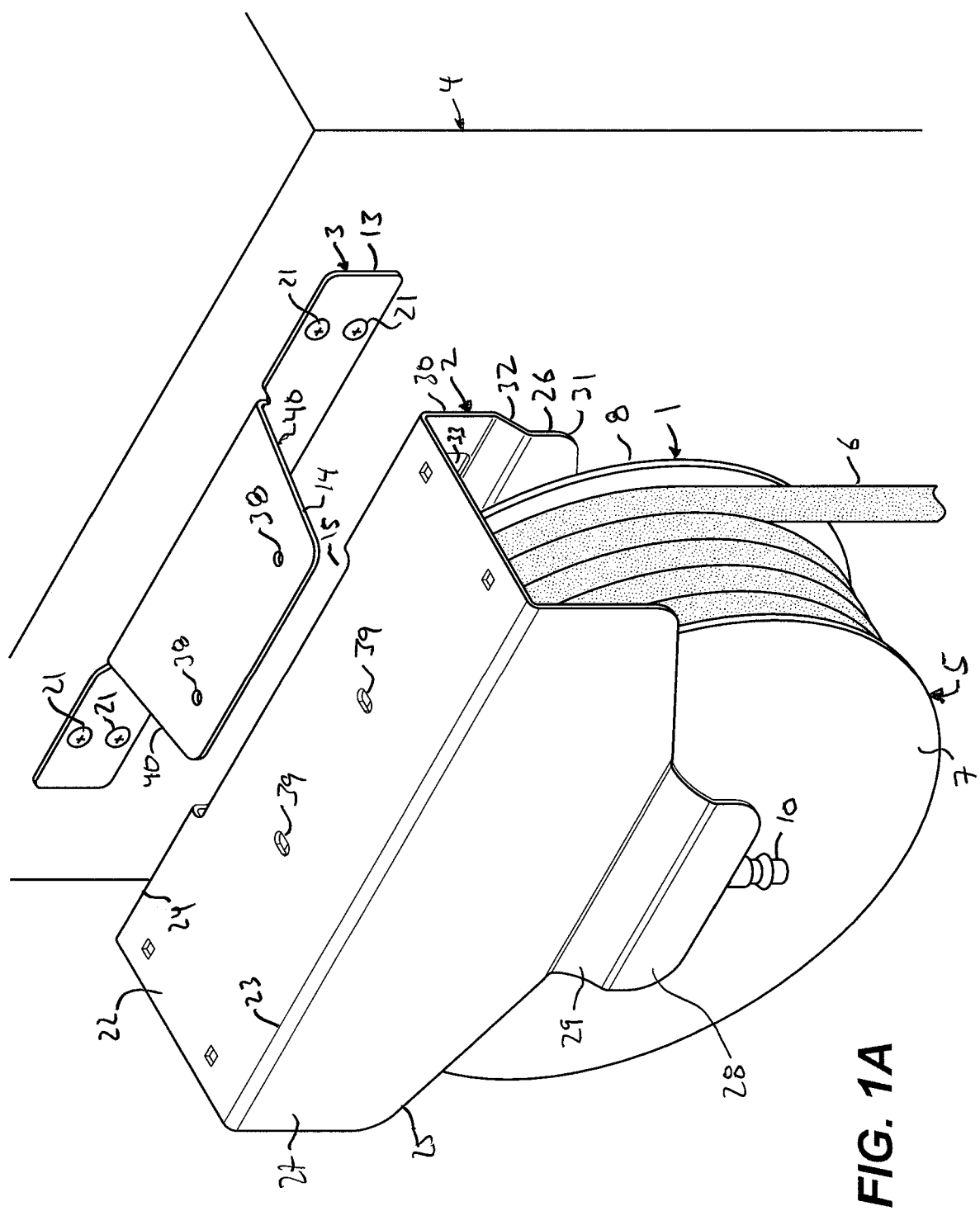
FIG. 1A is a perspective view of one embodiment of the mounting bracket and the frame of the present invention. The mounting bracket is shown connected to an anchoring support. The anchoring support shown in FIG. 1A is a rolling tool box. The frame has not been connected to the mounting bracket. The frame is shown supporting a hose reel with a hose wound around the hose reel.
Figure 5:
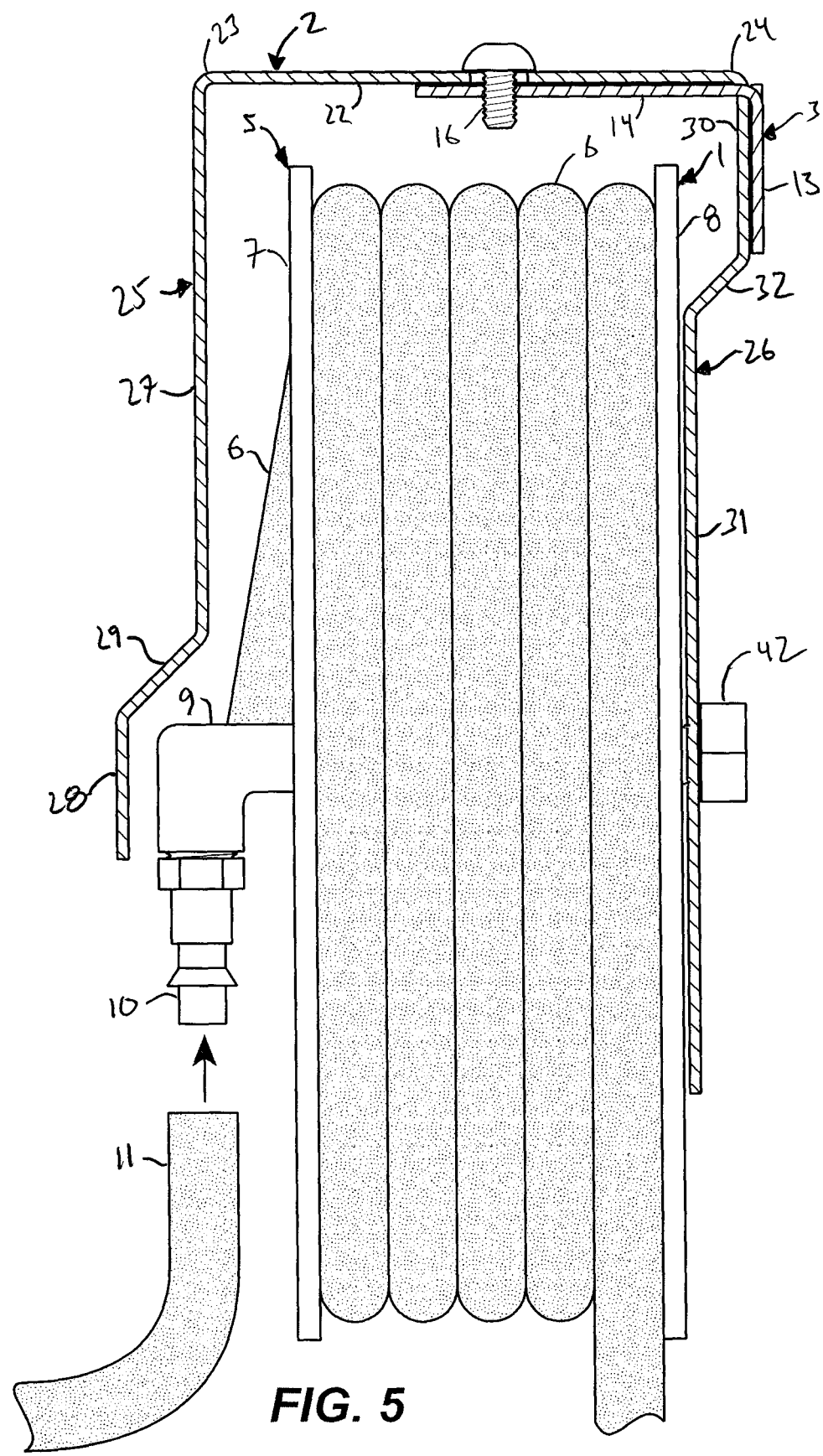
FIG. 5 is partially taken along view line 5 shown in FIG. 1C. View line 5 creates a section in the mounting bracket and the frame. The hose reel and the hose wound on the hose reel are not shown in section. A fluid source for the hose is shown in the drawing. The threaded mounting fastener for connecting the frame to the mounting bracket is not shown in cross-section.

As shown in FIGS. 1A and 5, a hose reel 1 is attached to a frame 2 which is formed to connect to a mounting bracket 3. The mounting bracket 3 is attached to an anchoring support 4. The hose reel 1 consists of a spool 5 onto which a hose 6 is wound. The spool has a first side wall 7 and a second side wall 8. The spool 5 includes a mount 9 for the hose. The mount 9 has a fluid inlet connector 10 for the mount 9. As shown in FIG. 5 there is a fluid source 11 in the form of a hose that supplies fluid to the mount 9 and the hose 6 when connected to the fluid inlet connector 10.

Figure 1B:
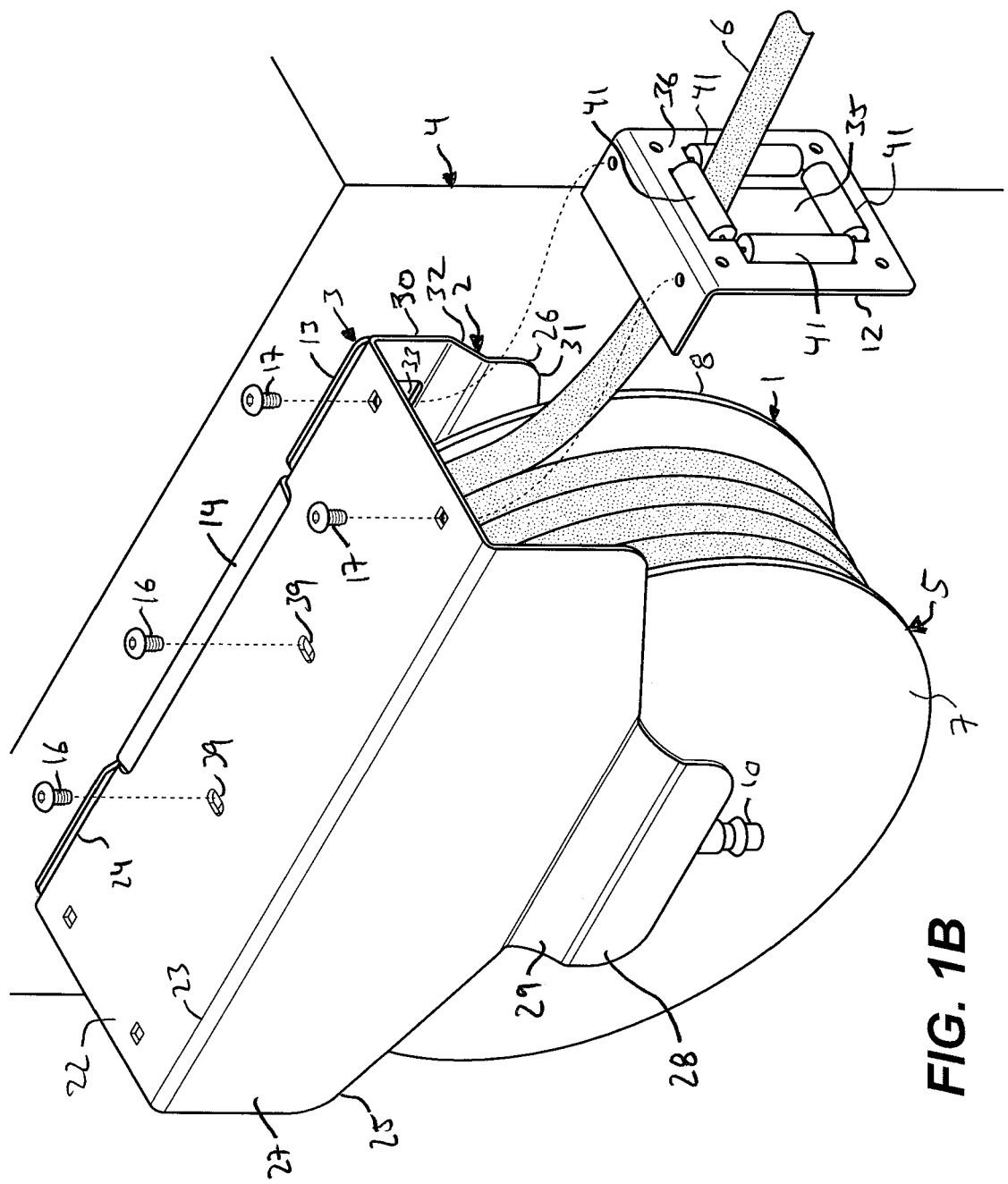
FIG. 1B is a perspective view of one embodiment of the mounting bracket and frame of the present invention. The mounting bracket is connected to an anchoring support. The frame is shown supporting a hose reel on which a hose is wound. The extension flange of the bracket is shown inserted into the connection slot of the frame. A guide is shown receiving the hose and ready to be connected to the frame.
Figure 1C:
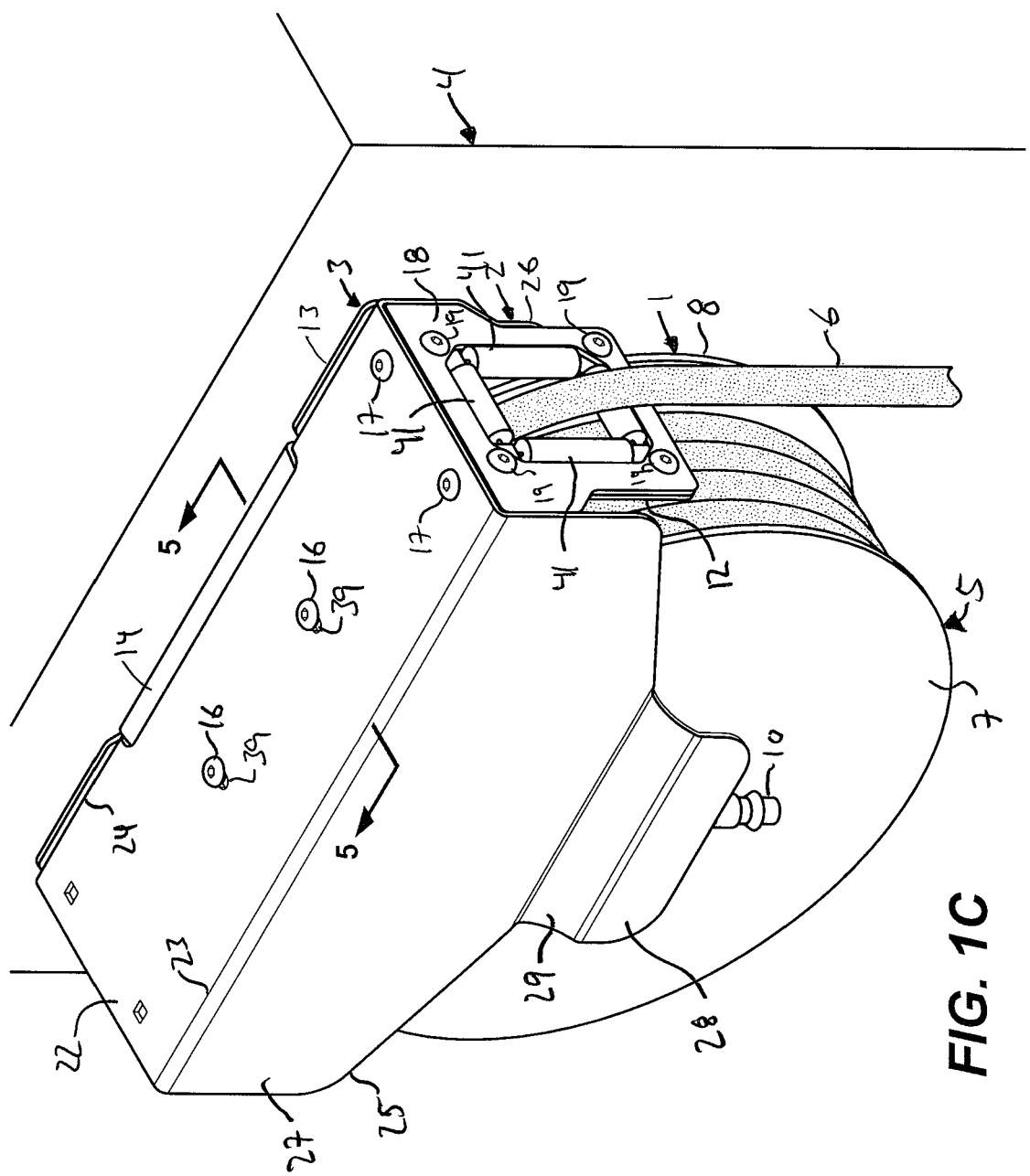
FIG. 1C is a perspective view of one embodiment of the mounting bracket and frame of the present invention. The mounting bracket is connected to an anchoring support. The frame is shown supporting a hose reel on which a hose is wound. The mounting bracket is shown attached to the frame by mounting fasteners. The guide is also attached to the frame by guide fasteners and a decorative plate is shown attached to the guide by plate fasteners.

As shown in FIGS. 1B and 1C, a guide 12 can be attached to the frame 2. The frame 2 and the mounting bracket 3 are preferably formed from cold-formed sheet steel cut from a blank and bent into their final forms.

Figure 2:
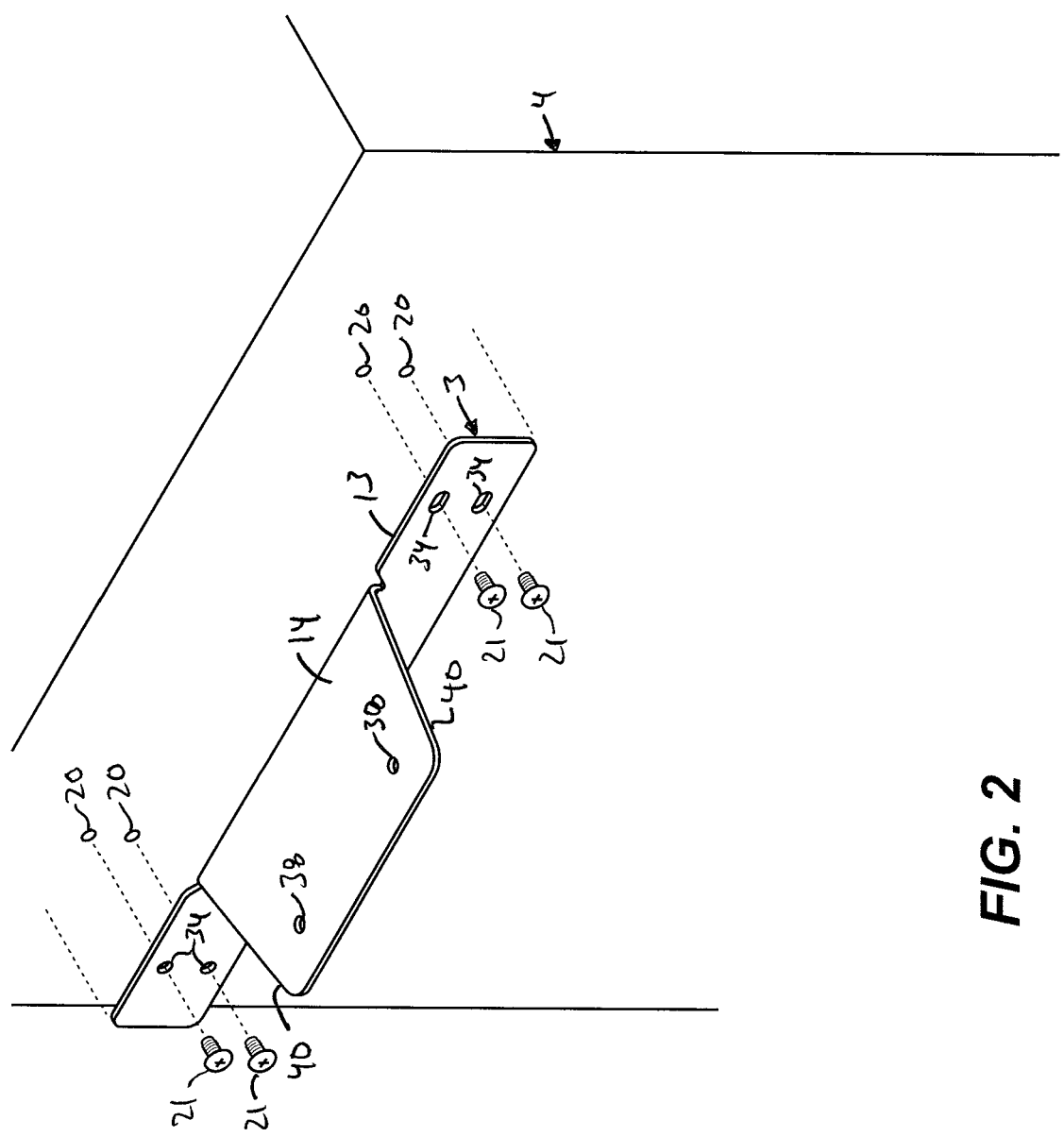
FIG. 2 is a perspective view of the mounting bracket shown in FIG. 1A. The mounting bracket is ready to be mounted to the anchoring support. Openings are shown in the anchoring support that receives the threaded fasteners shown in the drawing.

As shown in FIG. 1A, the mounting bracket 3 has a mounting flange 13 that is attached to the anchoring support 4 and an extension flange 14 that is connected to the mounting flange and disposed at an angle thereto. This angle is preferably an orthogonal angle. The extension flange 14 as shown in FIG. 1B is received by a connection slot 15 in the frame 2. Mounting fasteners 16 shown in FIGS. 1B and 1C connect the frame 2 to the extension flange 14. Guide fasteners 17 connect the guide 12 to the frame 2. As shown in FIG. 1C, a decorative plate 18 is attached to the guide 12 with plate fasteners 19. As shown in FIG. 2, openings 20 in the anchoring support 4 receive threaded anchoring fasteners 21 to attach the mounting bracket 3 to the anchoring support 4.

As shown in FIG. 2, the L-shaped mounting bracket 3 attached to the anchoring support 4, has an extension flange 14 and a mounting flange 13 disposed at an angle to the extension flange 14 with the mounting flange 13 being connected to the anchoring support 4. The frame 2 is attached to the mounting bracket 3. The frame supports the hose reel 1 in a manner that allows the hose reel 1 to rotate with respect to the frame 2.

Figure 6:
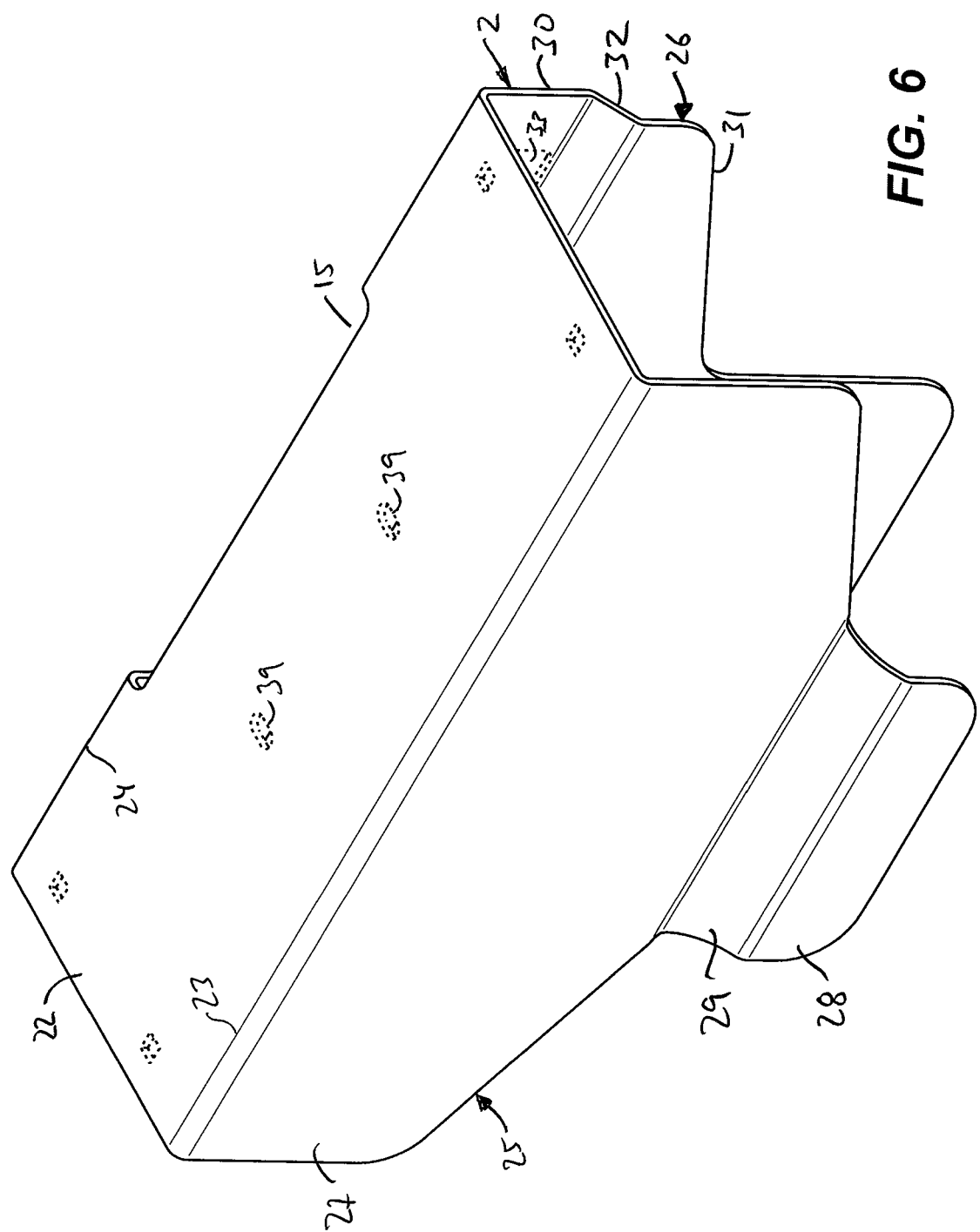
FIG. 6 is a perspective view of the frame. The fastener openings in the frame are shown in dotted lines.
Figure 8:
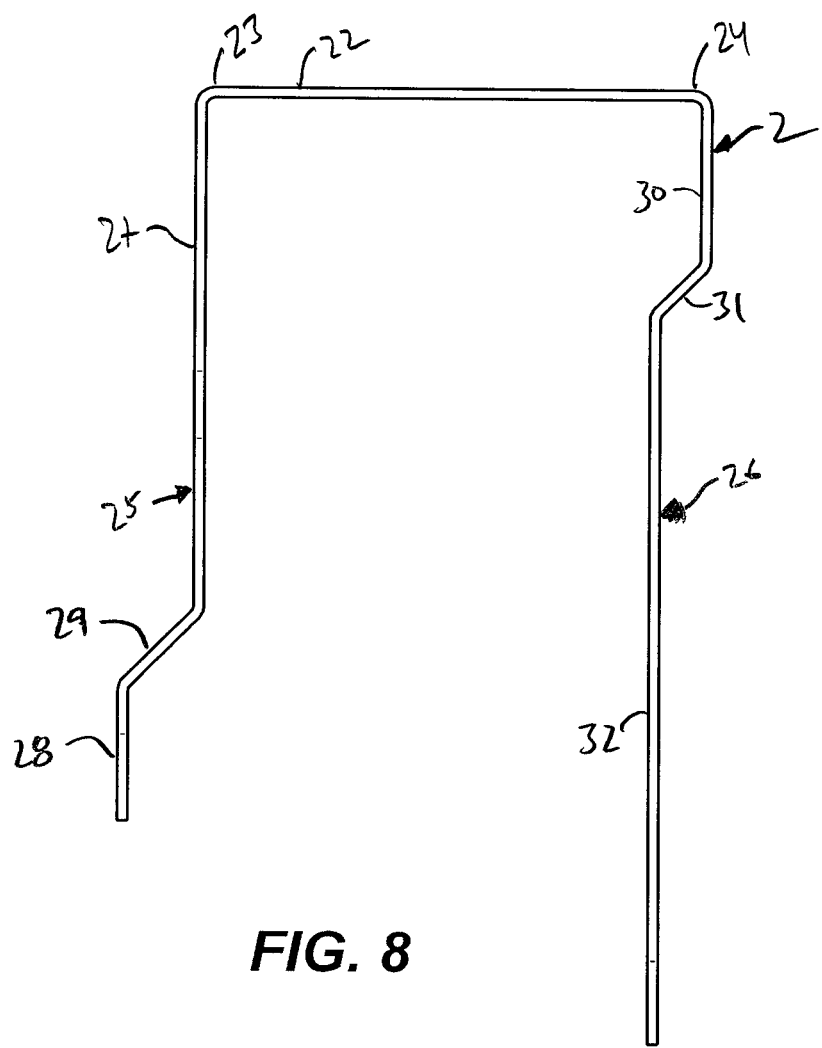
FIG. 8 is a right side view of the frame of FIG. 6. The left side view of the frame is the same.

As shown in FIGS. 6 and 8, the frame 2 is channel-shaped, having a substantially planar base 22 with first and second opposed, parallel edges 23 and 24, and first and second arms 25 and 26 extending from the base 22 in the same direction, the first arm 25 being connected to the base 22 at the first edge 23 and the second arm 26 being connected to the base 22 at the second edge 24. The first arm 25 is formed with a substantially planar first arm proximal portion 27 that is connected to the base 22 and a substantially planar first arm distal portion 28 that is substantially parallel to the substantially planar first arm proximal portion 27, and a first arm inclined connection portion 29 connects the first arm proximal portion 27 to the first arm distal portion 28, with the first arm inclined connection portion 29 being disposed at an angle to the first arm proximal portion 27 and the first arm distal portion 28.

Figure 7:
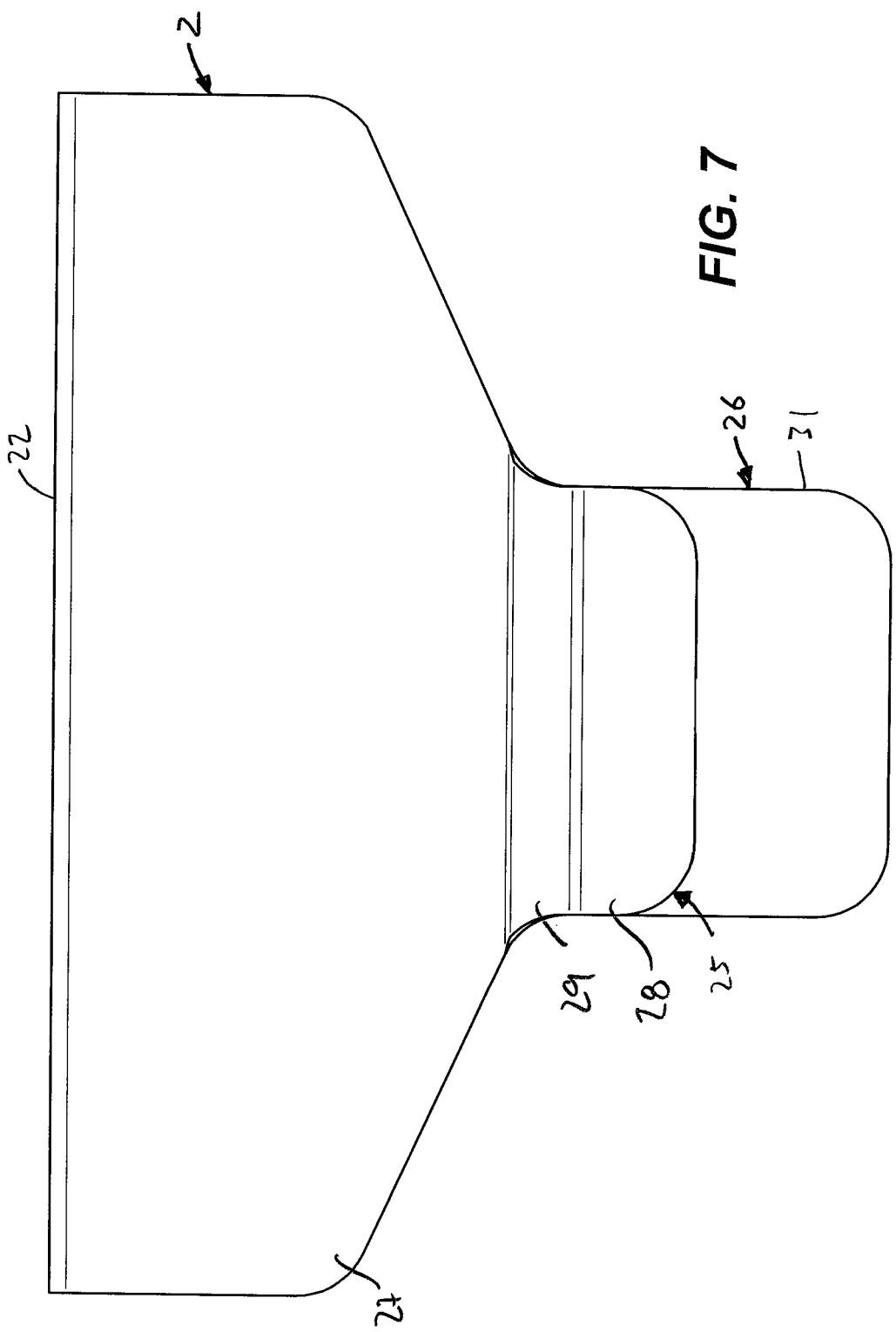
FIG. 7 is a front view of the frame of FIG. 6.

As shown in FIG. 8, the first arm distal portion 28 is disposed outwardly from the base 22 of the frame 2 in relation to the first arm proximal portion 27. Preferably, the first arm proximal portion 27 in a direction extending orthogonally from the base 22 has a longer longitudinal extent than the first arm distal portion 28. As shown in FIGS. 6 and 7, the first arm proximal portion 27 in a direction extending parallel with the first edge 23 has a portion that is wider than the first arm distal portion 28.

Figure 9:
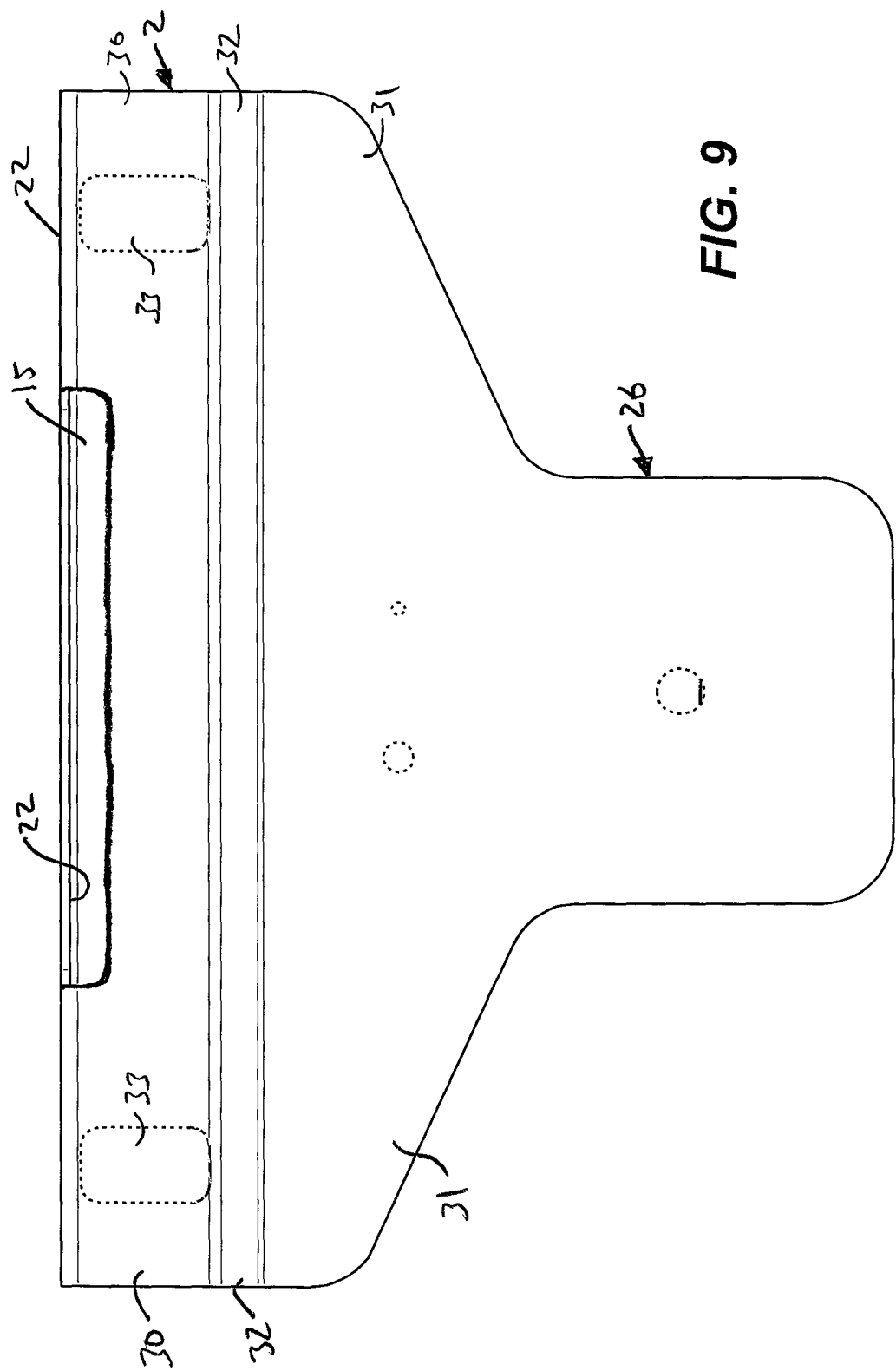
FIG. 9 is a back view of the frame of FIG. 6.
Figure 10:
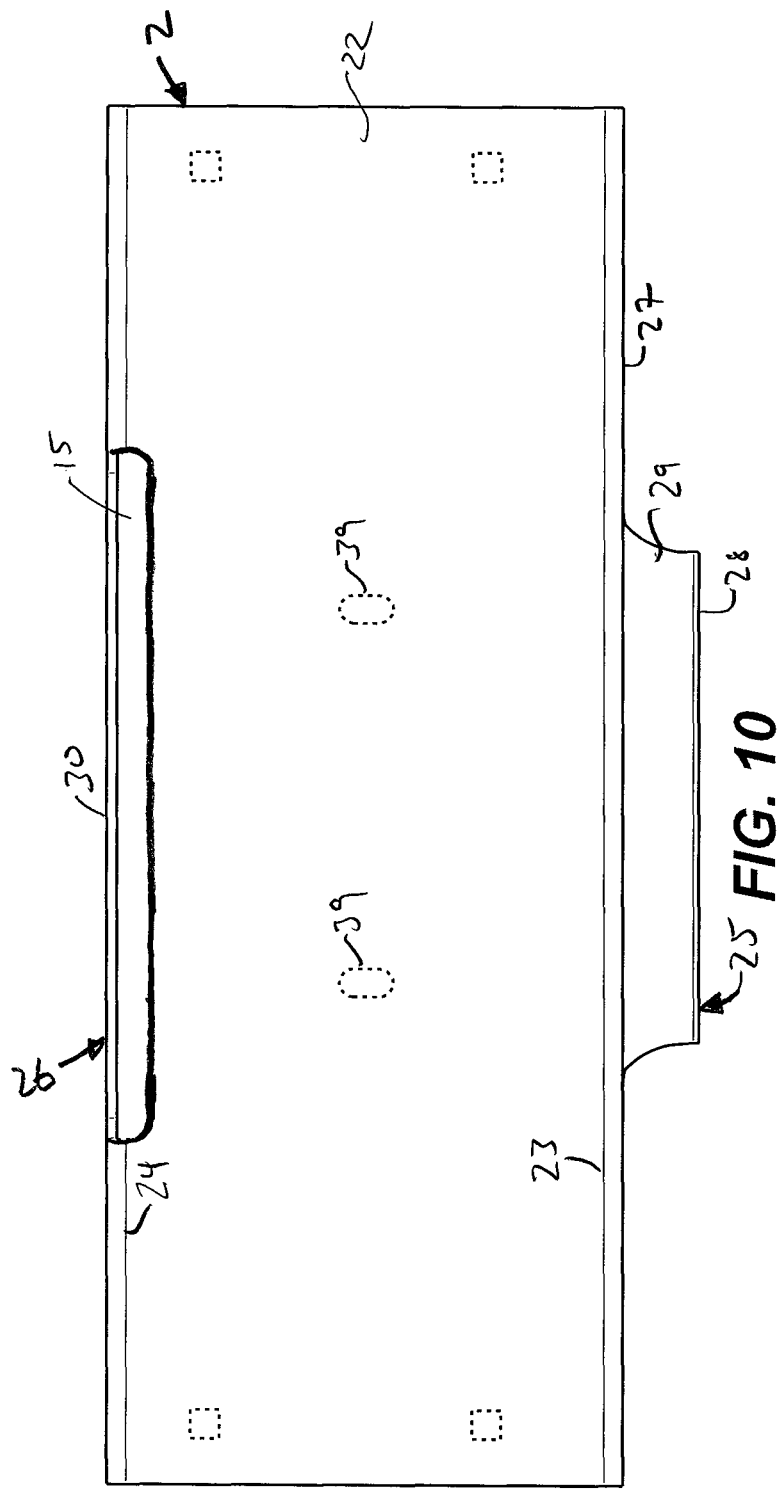
FIG. 10 is a top view of the frame of FIG. 6.
Figure 11:
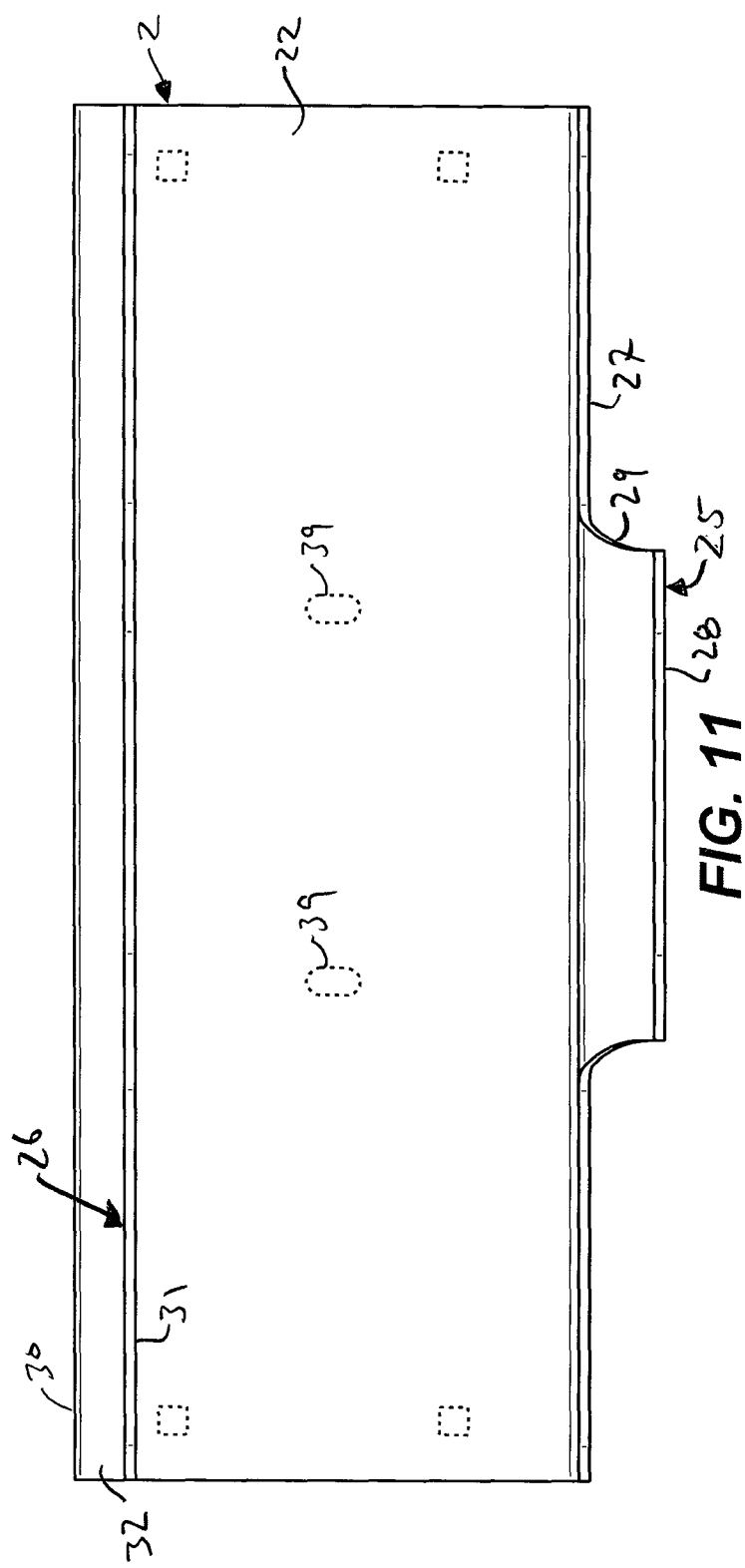
FIG. 11 is a bottom view of the frame of FIG. 6.

As shown in FIGS. 6, 8 and 9, the second arm 26 is formed with a substantially planar second arm proximal portion 30 that is connected to the base 22 and a substantially planar second arm distal portion 31 that is substantially parallel to the substantially planar second arm proximal portion 30, and an inclined second arm connection portion 32 connects the second arm proximal portion 30 to the second arm distal portion 31, with the second arm inclined connection portion 32 being disposed at an angle to the second arm proximal portion 30 and the second arm distal portion 31. As shown in FIG. 8, the second arm distal portion 31 is disposed inwardly from the base 22 of the frame 2 in relation to the second arm proximal portion 30. Preferably, the second arm proximal portion 30 in a direction extending orthogonally from the base 22 has a shorter longitudinal extent than the second arm distal portion 31. As shown in FIG. 9, the second arm proximal portion 30 in a direction extending parallel with the second edge 34 has a portion that is wider than the a portion of the second arm distal portion 31.

As shown in FIGS. 1B, 3, 4 and 5, the frame 2 receives the extension flange 14 of the mounting bracket 3 in a slot 14 in the frame 2. Preferably, the slot 14 in the frame 2 extends along the second edge 24 and is formed in a portion of the second arm 26.

Figure 4:
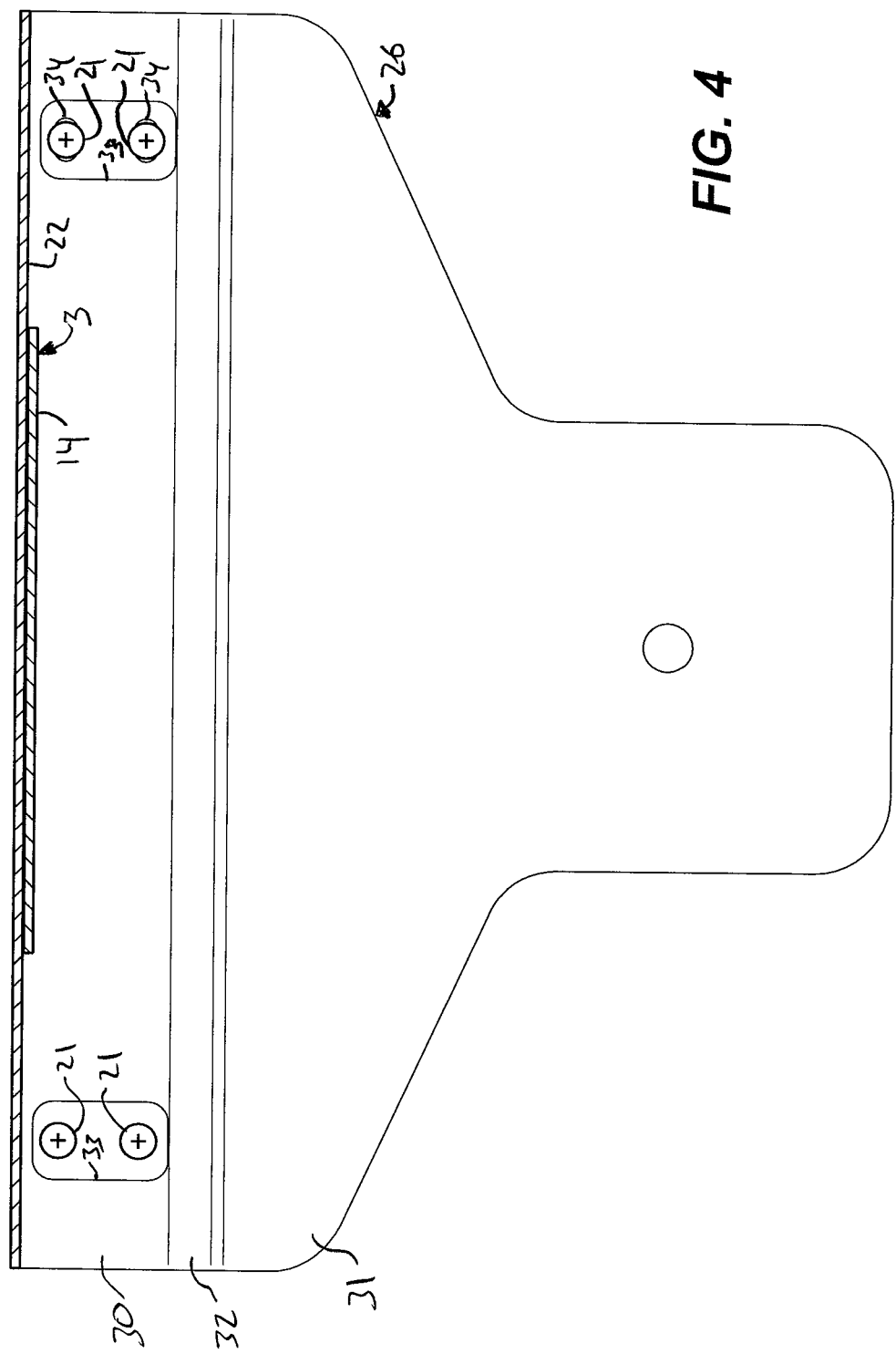
FIG. 4 is taken along view line 4 shown in FIG. 3.

As shown in FIGS. 1A and 4, preferably the second arm 26 is formed with a substantially planar second arm proximal portion 30 that is connected to the base 22 at the second edge 24, and the longitudinal extent of the second arm proximal portion 30 along the second edge 24 is substantially equal to the longitudinal extent of the base 22 along the second edge 24. Also preferably, the mounting flange 13 of the mounting bracket 3 substantially interfaces with a portion of the second arm proximal portion 30 and the longitudinal extent of the mounting flange 13 in parallel with the second edge 24 of the base 22 is substantially equal to the longitudinal extent of the second arm proximal portion 30 along the second edge 24. As shown in FIG. 4, the second arm proximal portion 30 is formed with one or more access openings 33 that align with anchoring openings 34 in the mounting flange 13 of the mounting bracket 3.

As shown in FIGS. 5 and 1C, preferably the extension flange 14 of the mounting bracket 3 substantially interfaces with a portion of the base 22 of the frame 2. Also, preferably the base 22 of the frame 2 is connected to the extension flange 14 of the mounting bracket 3 with mounting fasteners 16.

As shown in FIGS. 1B and 1C, a guide 12 is attached to the frame 2, the guide 12 has an opening 35 that receives the hose 6 that is attached to the hose reel 1. The guide 12 attached to the frame 2 has an outer surface 36 disposed away from the hose reel 1 and a decorative plate 18 is attached to the outer surface 36 of the guide 12.

Figure 3:
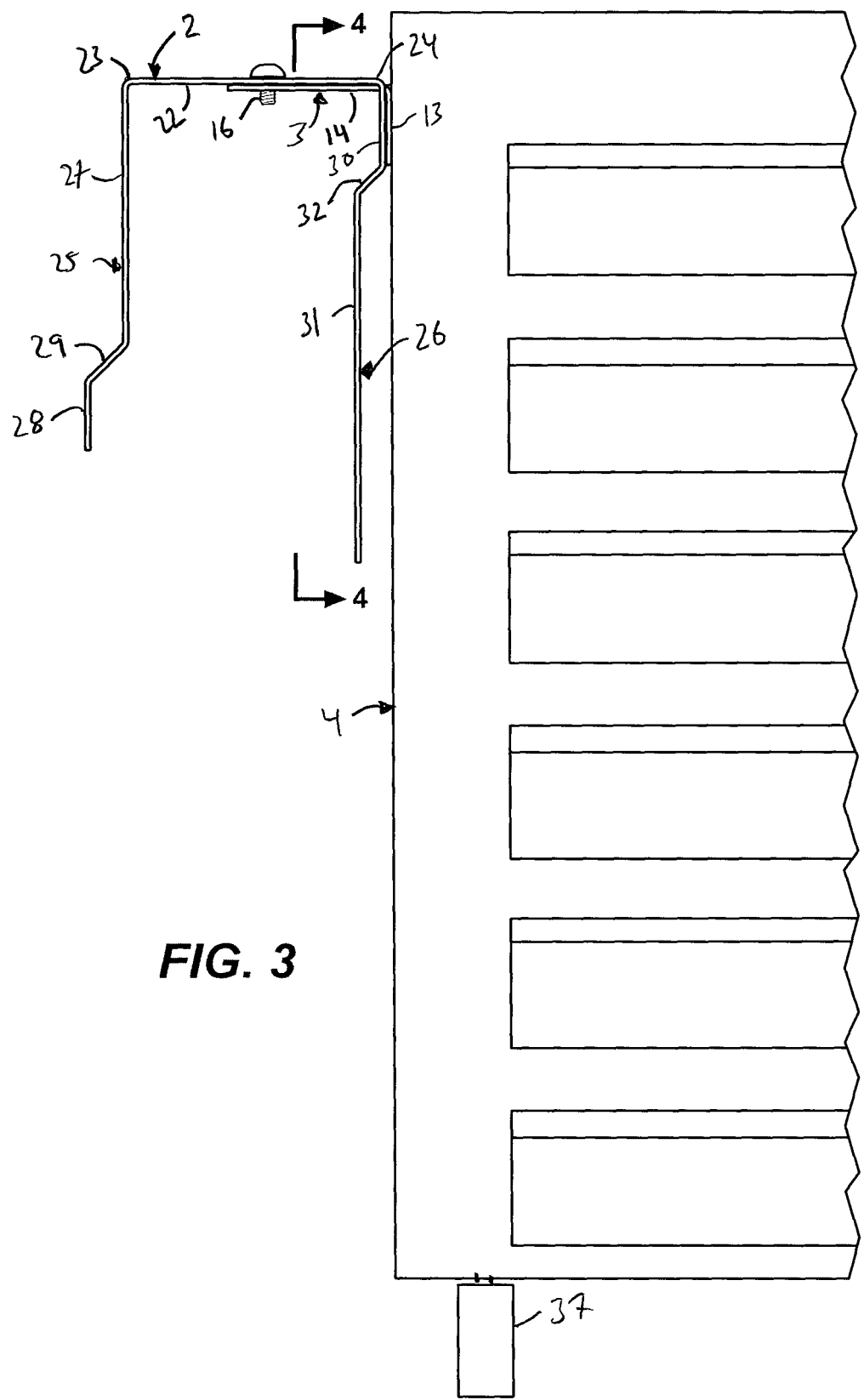
FIG. 3 is a side view of the mounting bracket and frame connected to each other. The mounting bracket is connected to an anchoring support which is a rolling tool box.

As shown in FIG. 3, the anchoring support 4 is a tool box that that is supported by casters 37 at its base.

Figure 17:
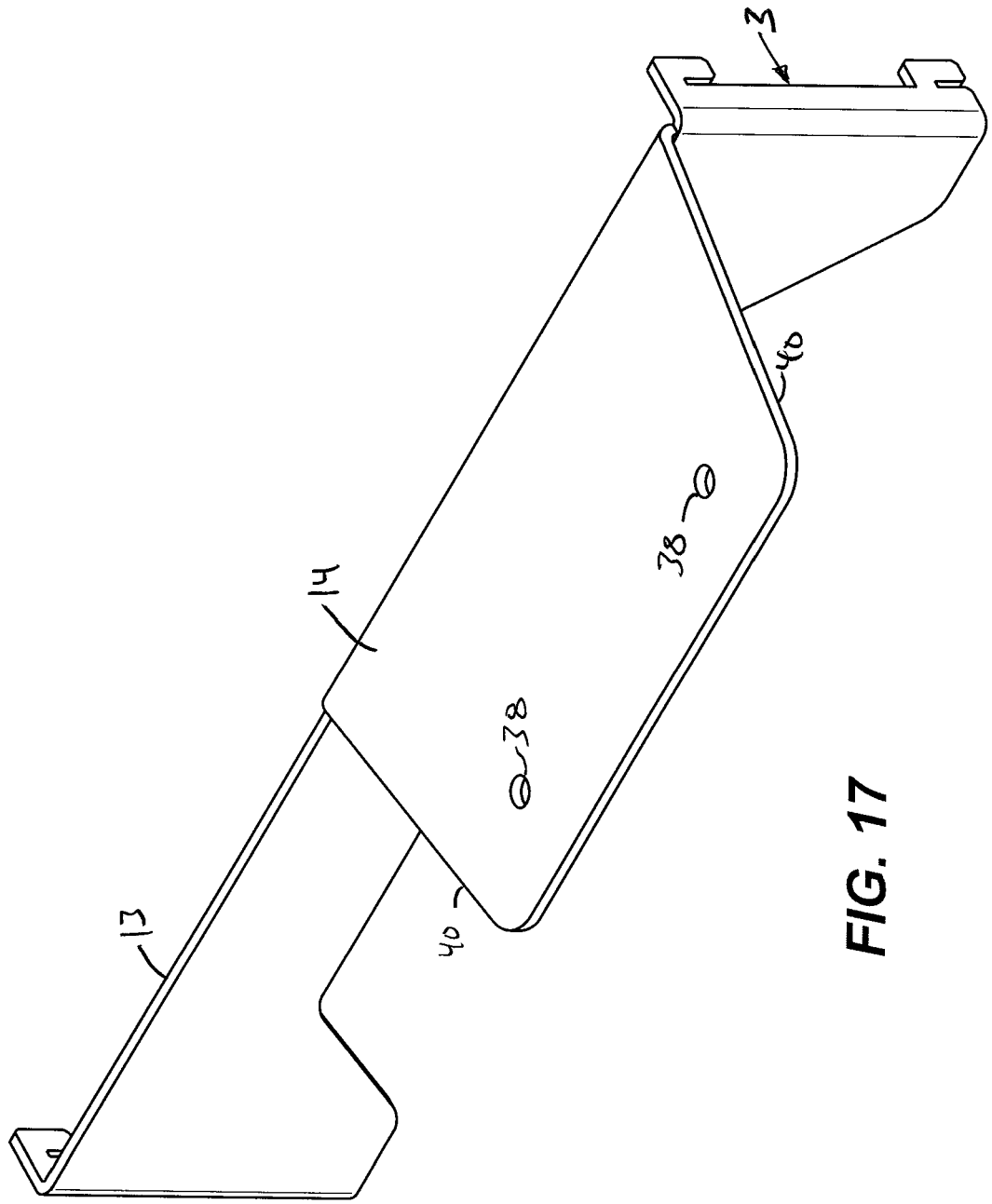
FIG. 17 is a perspective view of an alternate embodiment of the mounting bracket of the present invention.
Figure 19:
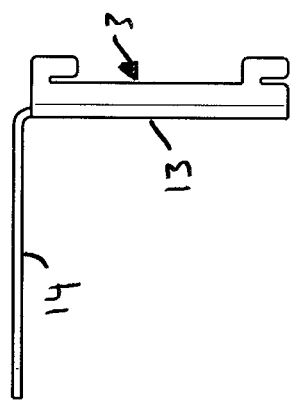
FIG. 19 is right side view of the mounting bracket of FIG. 17. The left side view is the same.
Figure 18:
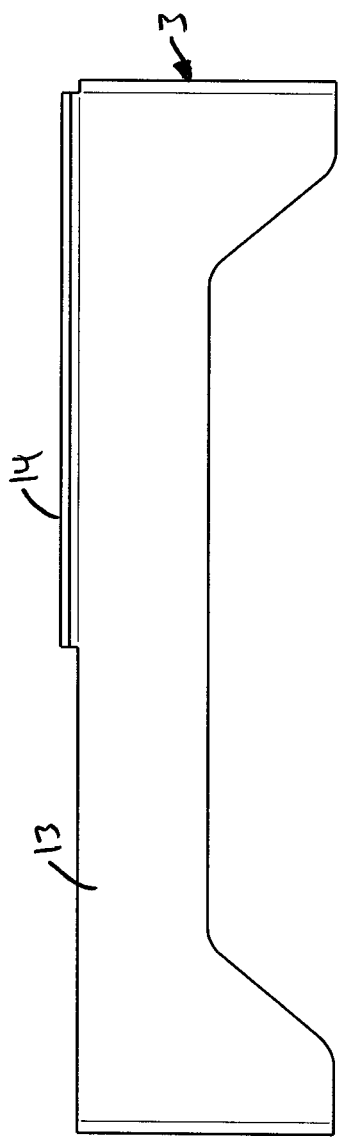
FIG. 18 is front view of the mounting bracket of FIG. 17.
Figure 20:
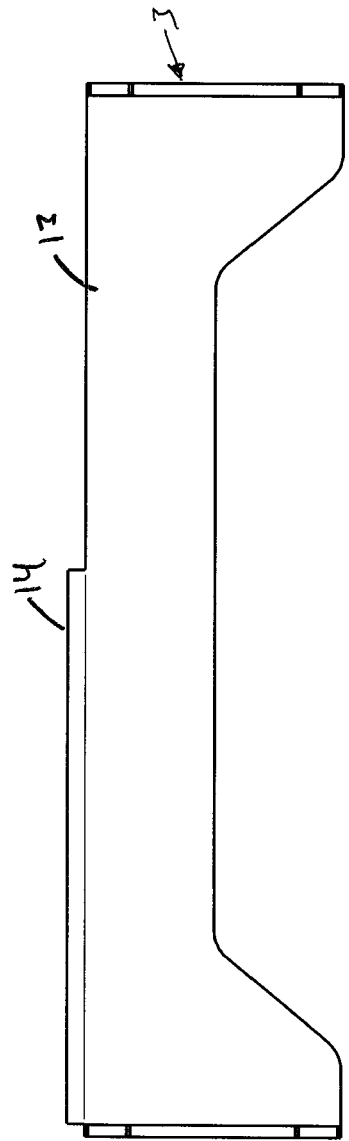
FIG. 20 is a back view of the mounting bracket of FIG. 17.
Figure 21:
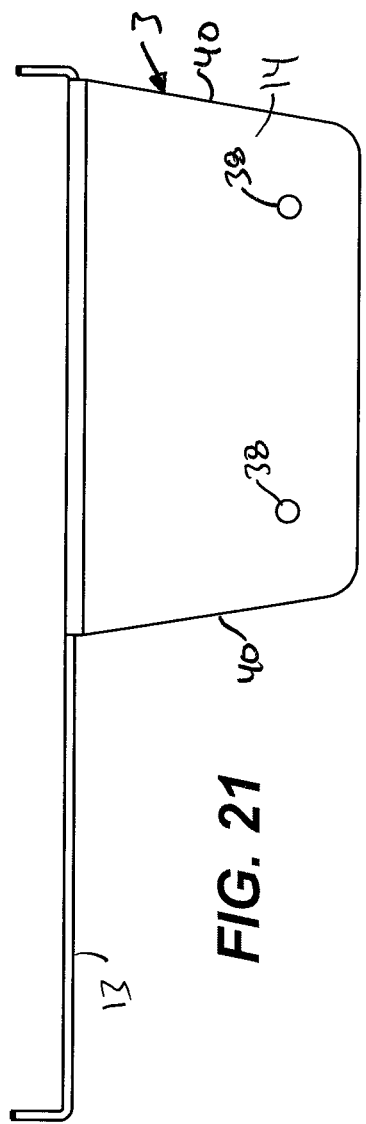
FIG. 21 is a top view of the mounting bracket of FIG. 17.
Figure 22:
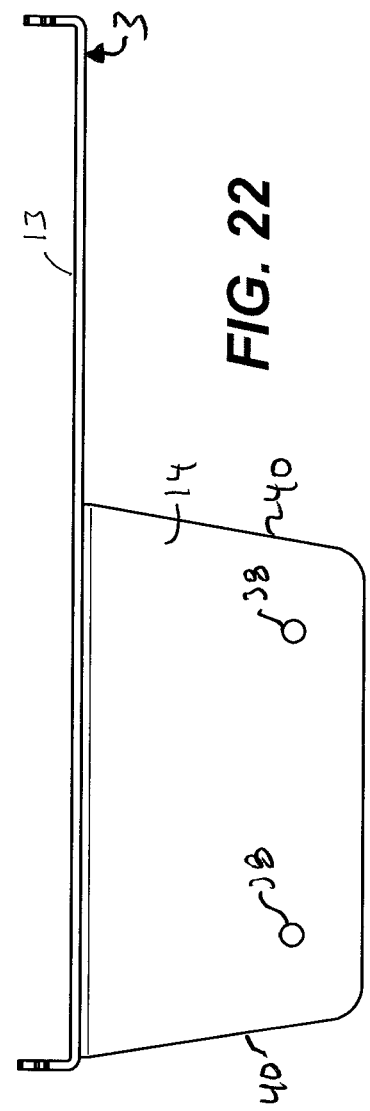
FIG. 22 is a bottom view of the mounting bracket of FIG. 17.
Figure 23A:
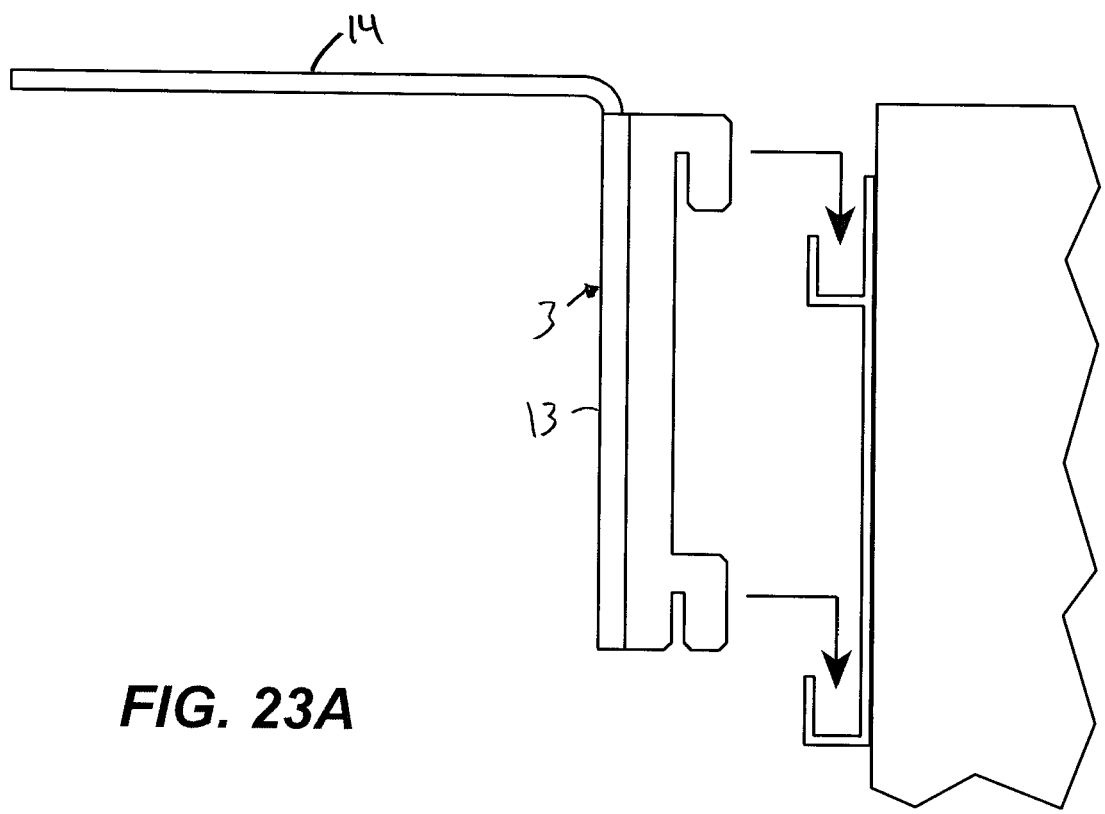
FIG. 23A is side view of the mounting bracket of FIG. 17 ready to be mounted on an anchoring support.
Figure 23B:
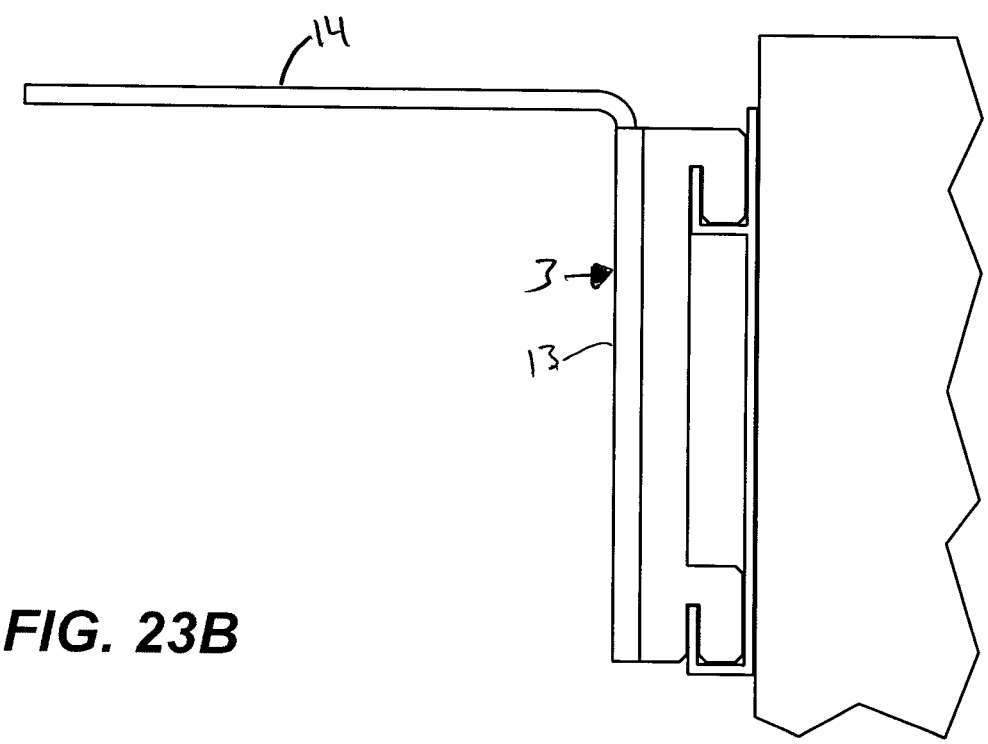
FIG. 23B is a side view of the mounting bracket of FIG. 17 mounted on the anchoring support.
Figure 24:
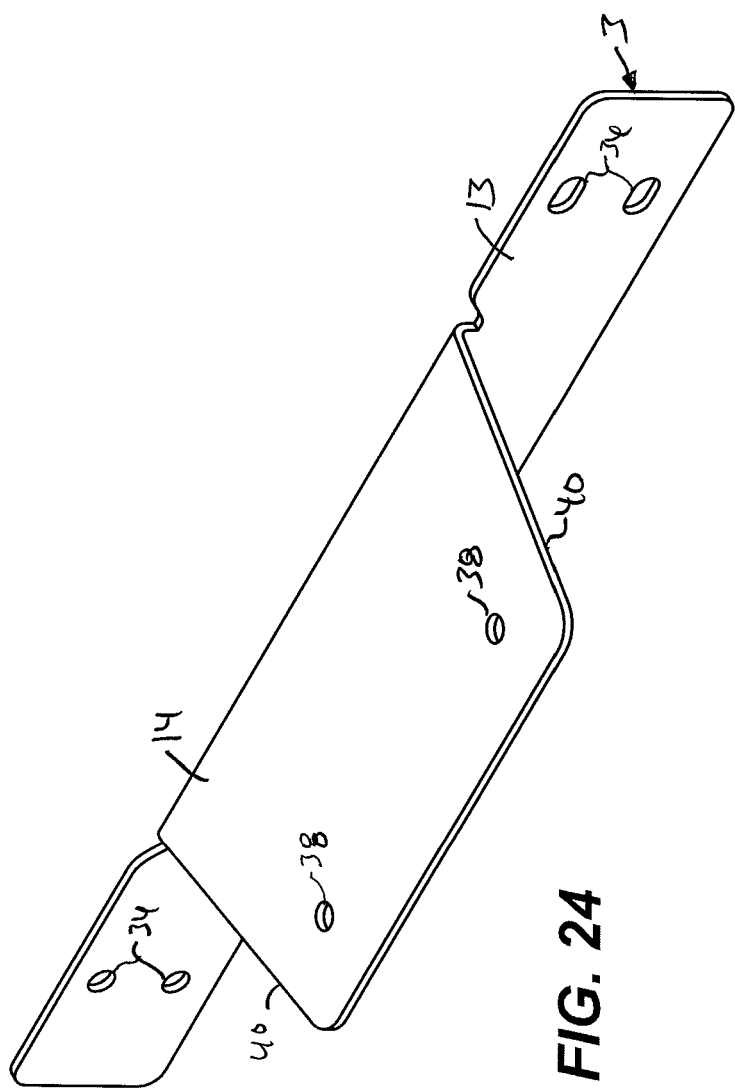
FIG. 24 is a perspective view of alternate form of the mounting bracket.
Figure 26:
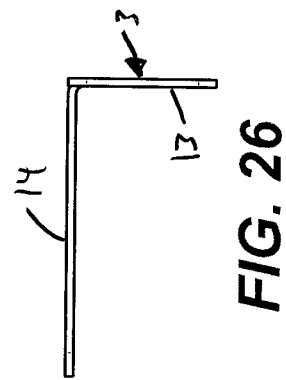
FIG. 26 is a right side view of the mounting bracket of FIG. 24. The left side view is the same.
Figure 25:
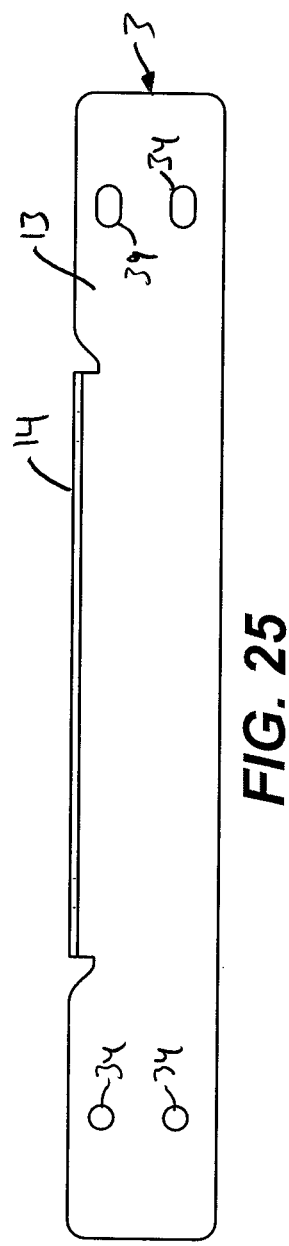
FIG. 25 is a front view of the mounting bracket of FIG. 24.
Figure 27:
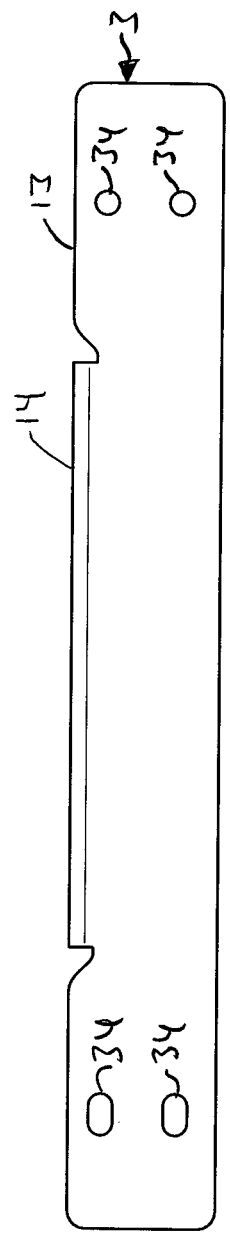
FIG. 27 is back view of the mounting bracket of FIG. 24.
Figure 30:
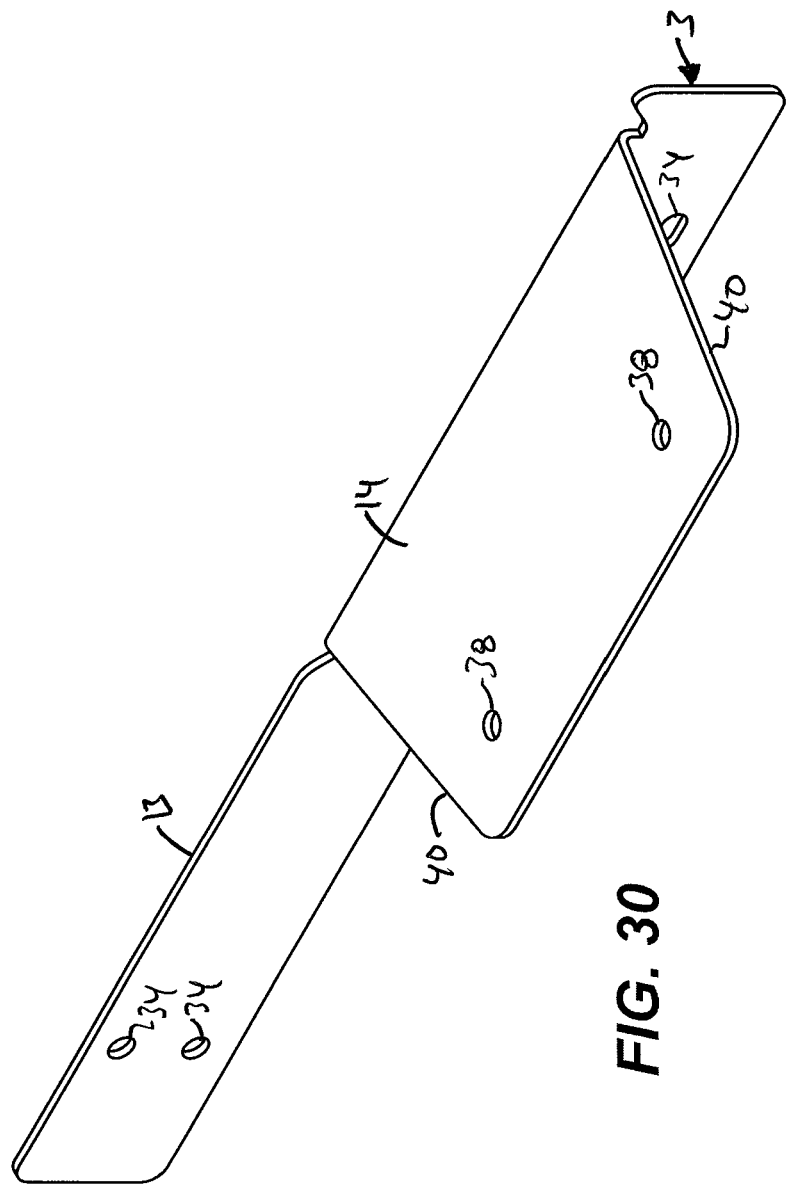
FIG. 30 is a perspective view of an alternate form of the mounting bracket.
Figure 34:
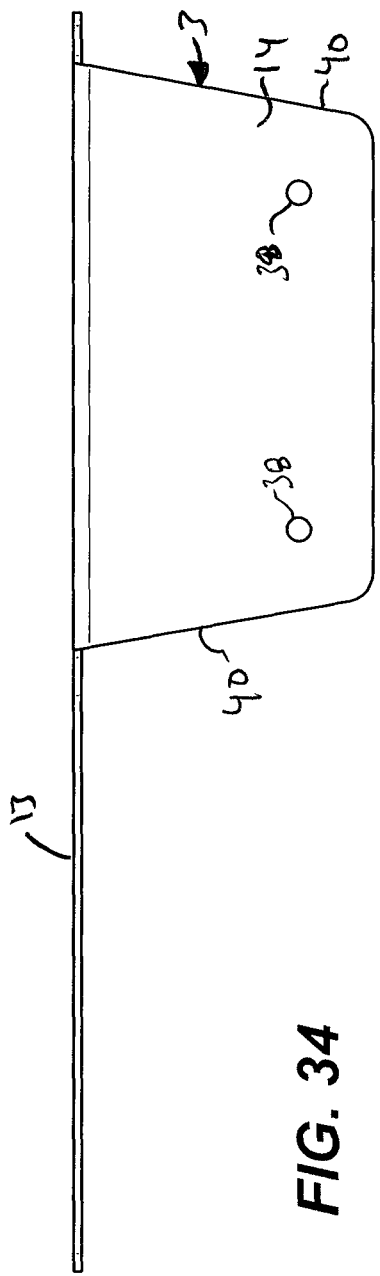
FIG. 34 is a top view of the mounting bracket of FIG. 30.
Figure 35:
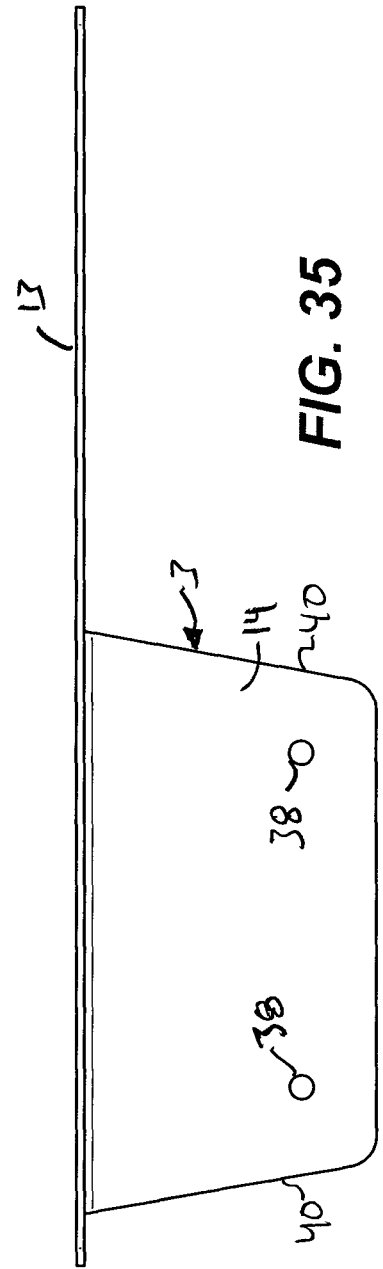
FIG. 35 is a bottom view of the mounting bracket of FIG. 30.
Figure 36:
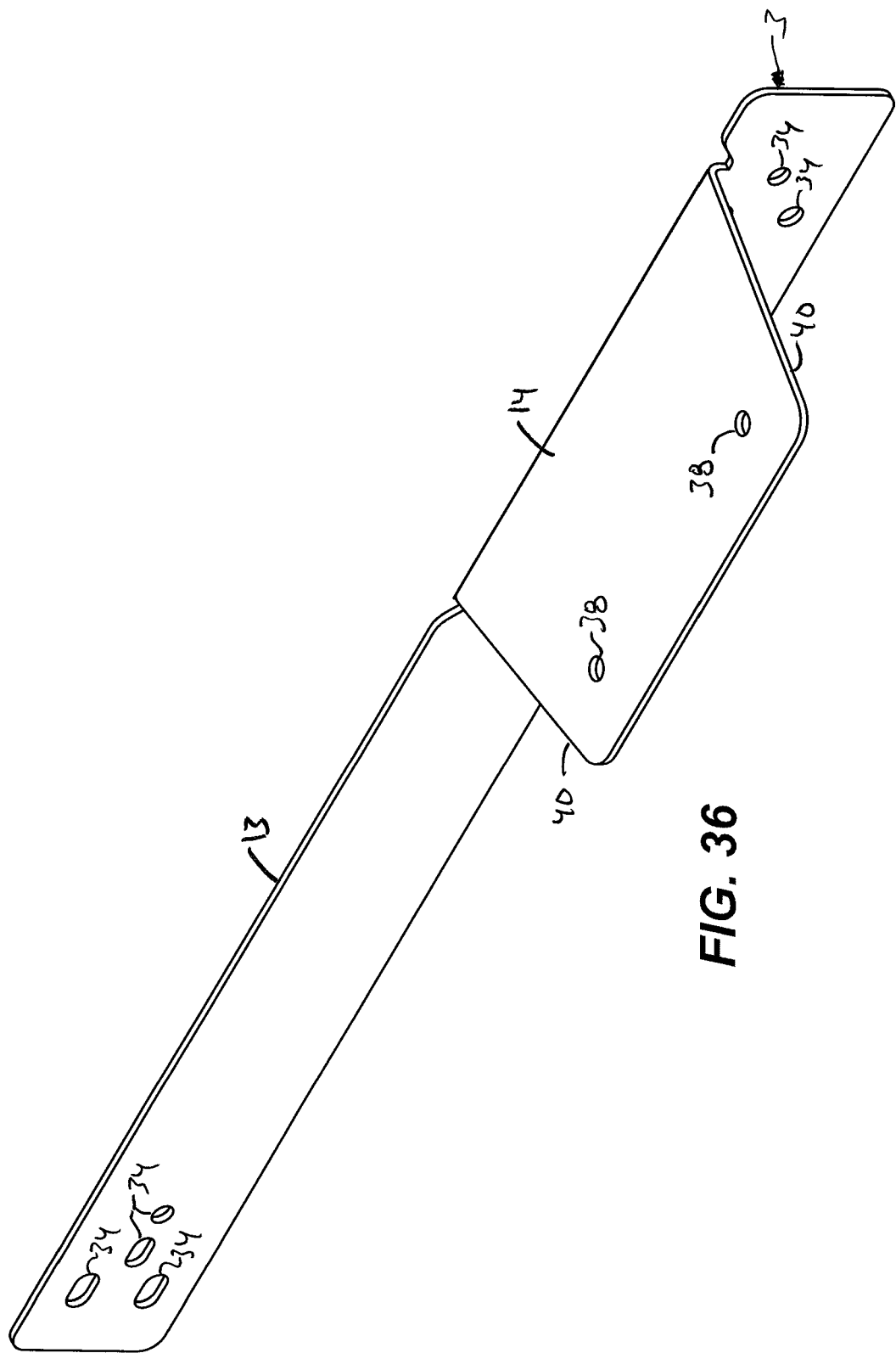
FIG. 36 is a perspective view of an alternate form of the mounting bracket.
Figure 37:
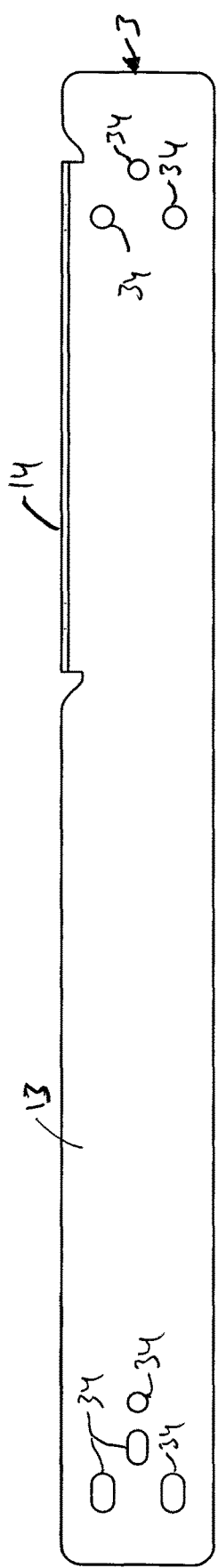
FIG. 37 is a front view of the mounting bracket of FIG. 36.
Figure 38:
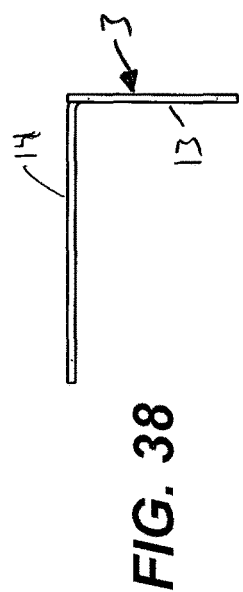
FIG. 38 is a right side view of the mounting bracket of FIG. 36. The left side view is the same.
Figure 39:
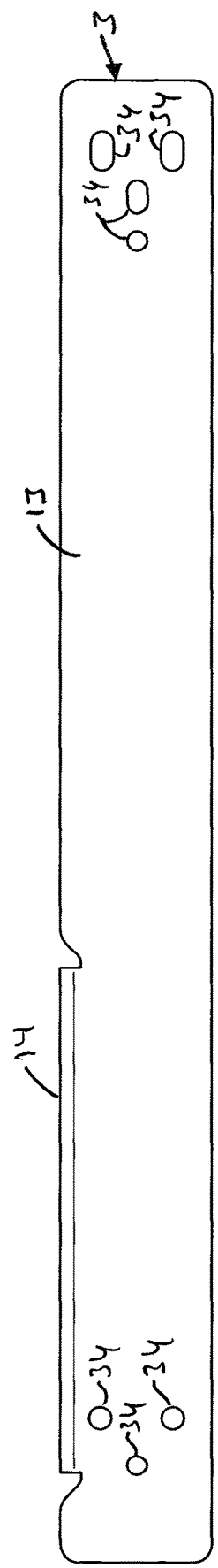
FIG. 39 is back view of the mounting bracket of FIG. 36.

As shown in FIGS. 17 and 23A and 23B, the mounting flange 13 of the mounting bracket 3 in certain embodiments can have extension legs 38 that engage extension shoulders 39 attached to the anchoring support 4.

As shown in FIGS. 5, 1A and 1C, the base 22 of the frame 2 is connected to the extension flange 14 of the mounting bracket 3 with mounting fasteners 16 that have threaded shanks and are threaded into mounting openings 38 on the extension flange 14 of the mounting bracket 3. The mounting openings 38 are preferably circular and do not need to be initially threaded. The mounting fasteners 16 can cut threads in the extension flange 14. The mounting fasteners 16 are inserted through slotted openings 39 in the base 22. The slotted openings 22 allow for easier alignment of the mounting fasteners 16 with the mounting openings 38.

As shown in FIGS. 1A and 1B, the extension flange 14 is formed with angled lateral edges 40 that make it easier to insert the extension flange 14 into the connection slot 15. The guide 12 is provided with rollers 41 to protect the hose 6 as it travels through the opening 35 in the guide.

As shown in FIGS. 4 and 2, the anchoring openings 34 in the mounting flange 13 can be a variety of shapes. The anchoring openings shown in FIG. 2 are circular and elongated slots. The elongated slots allow for slight differences in tolerances.

FIG. 5 shows a hexagonal-head spool fastener 42 connecting the hose reel to the second arm distal portion 31. The inlet end of the hose 6 is shown extending out of the first side wall 7 of the spool 5. The inlet end of the hose 6 connects to the mount 9 for the hose. An opening is usually provided in the first side wall 7 of the spool 5 to allow the hose 6 extend out of the spool 5 to connect to the mount 9.

Figure 42:
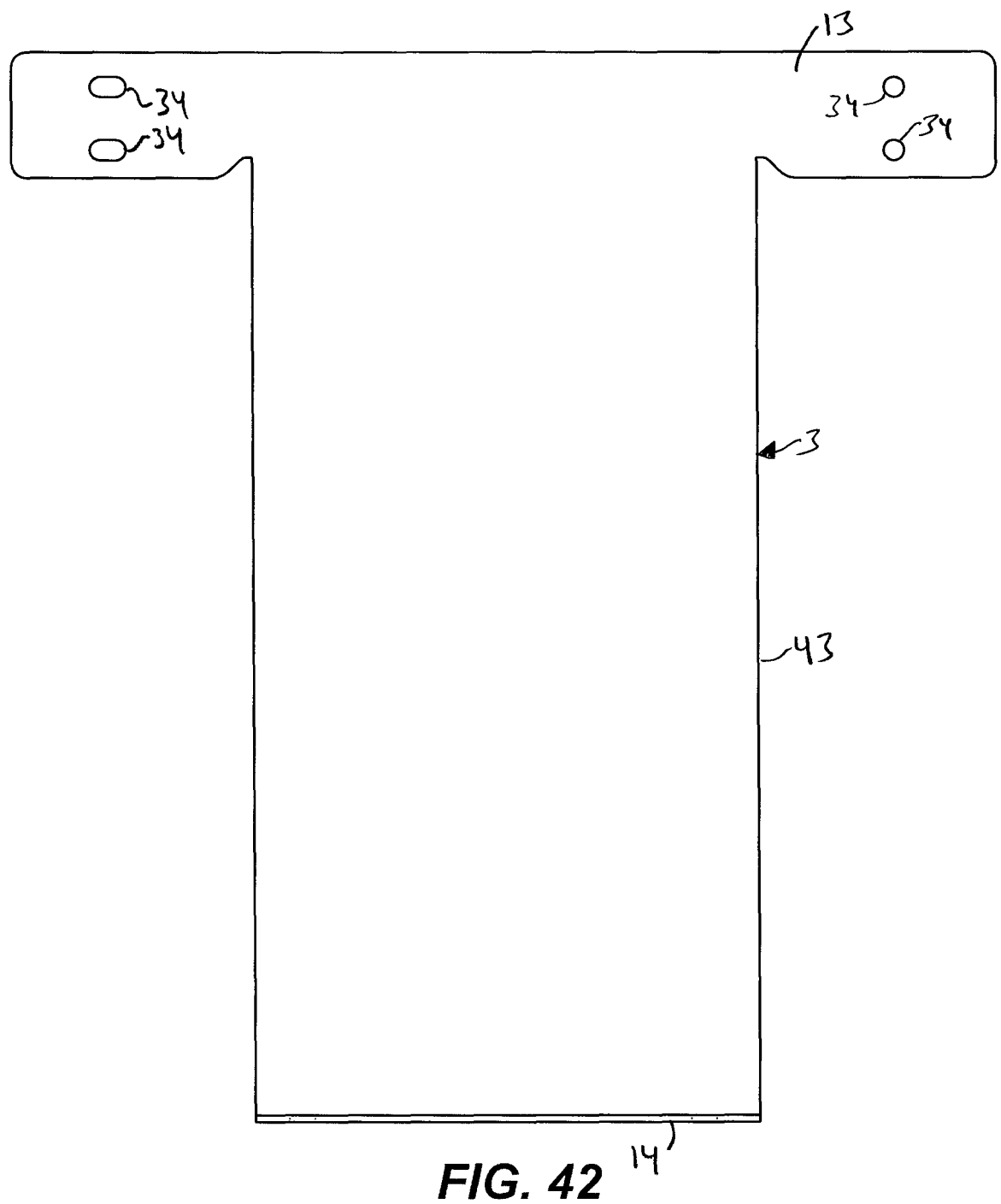
FIG. 42 is a front view of an alternate form of the mounting bracket.
Figure 43:
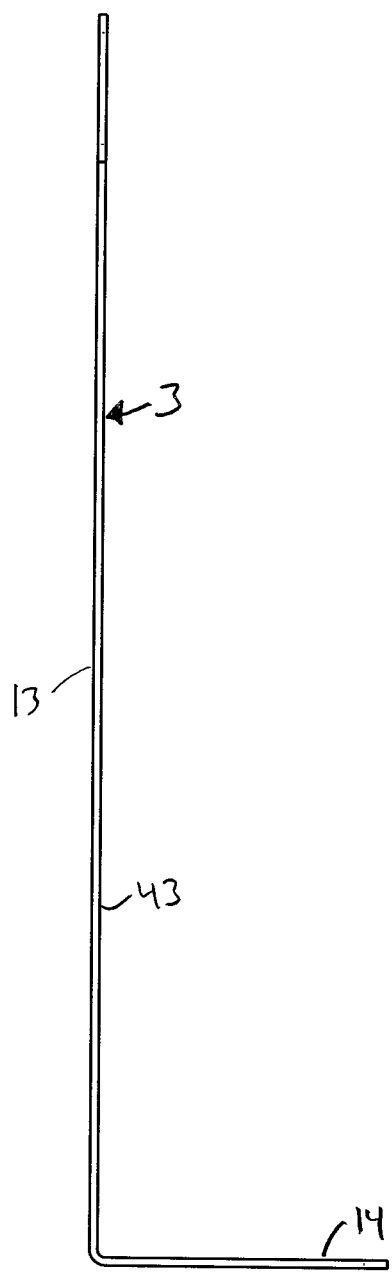
FIG. 43 is a left side view of the mounting bracket of FIG. 42. The right side view is the same.
Figure 44:
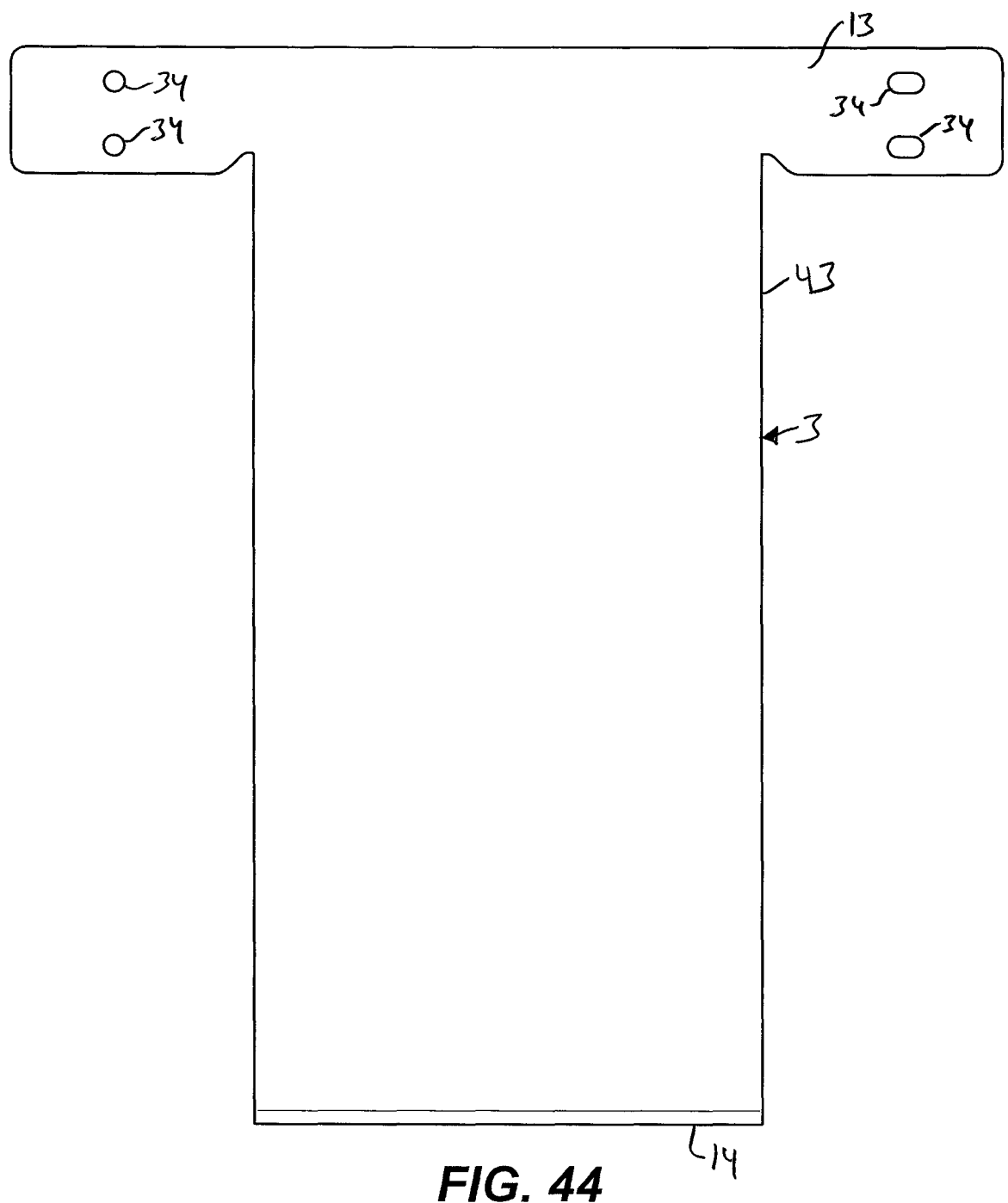
FIG. 44 is back view of the mounting bracket of FIG. 42.
Figure 45:
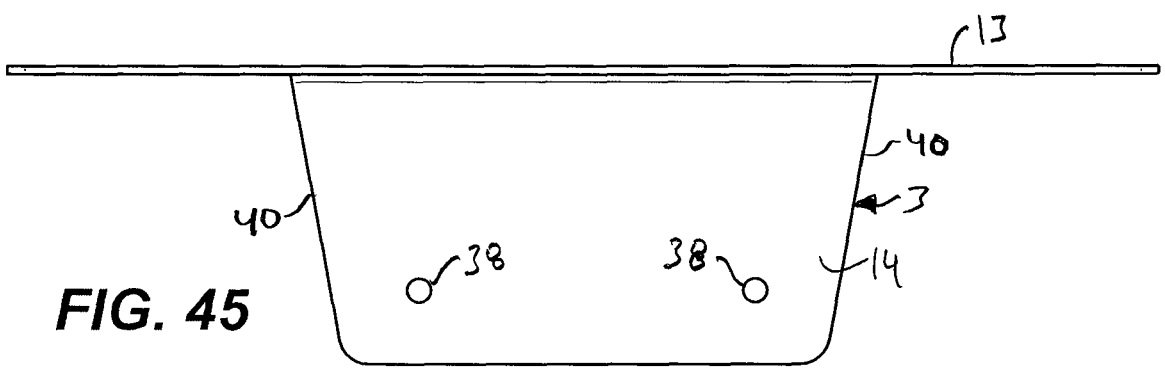
FIG. 45 is a top view of the mounting bracket of FIG. 42.
Figure 46:
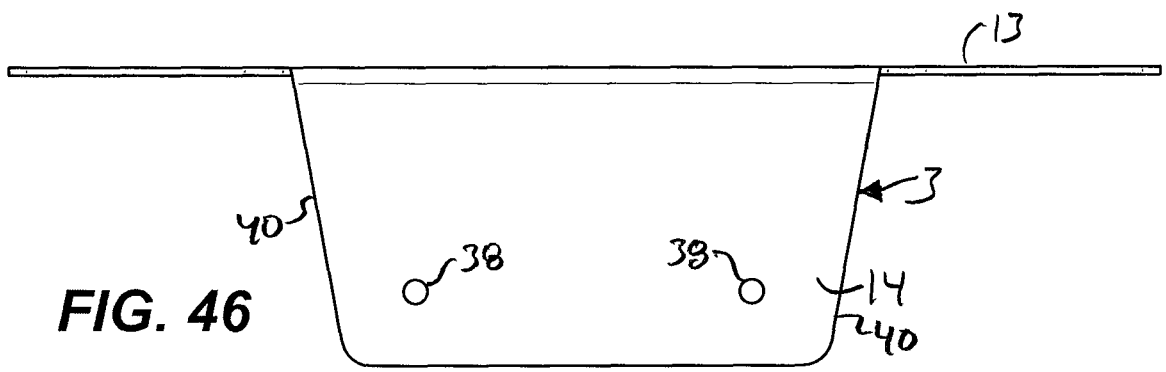
FIG. 46 is a bottom view of the mounting bracket of FIG. 42.

As shown in FIG. 42, the mounting bracket 3 can be provided with a long, downwardly extending tab 43 on the mounting flange 13 so that the hose reel 1 can be located remotely from the anchoring fasteners 21 and low down on a rolling tool box so as to avoid causing the tool box to tip over.

I claim:
1. A connection between a hose reel and an anchoring support, the connection comprising:
 a. the anchoring support;
 b. an L-shaped mounting bracket attached to the anchoring support, the L-shaped mounting bracket having an extension flange and a mounting flange disposed at an angle to the extension flange with the mounting flange being connected to the anchoring support;
 c. a frame attached to the mounting bracket, the frame supporting the hose reel in a manner that allows the hose reel to rotate with respect to the frame; wherein
 d. the frame is channel-shaped, having a substantially planar base with first and second opposed, parallel edges, and first and second arms extending from the base in the same direction, the first arm being connected to the base at the first edge and the second arm being connected to the base at the second edge; and
 e. the first arm is formed with a substantially planar first arm proximal portion that is connected to the base and a substantially planar first arm distal portion that is substantially parallel to the substantially planar first arm proximal portion, and a first arm inclined connection portion connects the first arm proximal portion to the first arm distal portion, with the first arm inclined connection portion being disposed at an angle to the first arm proximal portion and the first arm distal portion.

2. The connection of claim 1, wherein:
the first arm distal portion is disposed outwardly from the base of the frame in relation to the first arm proximal portion.

3. The connection of claim 2, wherein:
the first arm proximal portion in a direction extending orthogonally from the base has a longer longitudinal extent than the first arm distal portion.

4. The connection of claim 2, wherein:
the first arm proximal portion in a direction extending parallel with the first edge has a portion that is wider than the first arm distal portion.

5. A connection between a hose reel and an anchoring support, the connection comprising:
 a. the anchoring support;
 b. an L-shaped mounting bracket attached to the anchoring support, the L-shaped mounting bracket having an extension flange and a mounting flange disposed at an angle to the extension flange with the mounting flange being connected to the anchoring support;
 c. a frame attached to the mounting bracket, the frame supporting the hose reel in a manner that allows the hose reel to rotate with respect to the frame; wherein
 d. the frame is channel-shaped, having a substantially planar base with first and second opposed, parallel edges, and first and second arms extending from the base in the same direction, the first arm being connected to the base at the first edge and the second arm being connected to the base at the second edge; and
 e. the second arm is formed with a substantially planar second arm proximal portion that is connected to the base and a substantially planar second arm distal portion that is substantially parallel to the substantially planar second arm proximal portion, and a second arm inclined connection portion connects the second arm proximal portion to the second arm distal portion, with the second arm inclined connection portion being disposed at an angle to the second arm proximal portion and the second arm distal portion.

6. The connection of claim 5, wherein:
the second arm distal portion is disposed inwardly from the base of the frame in relation to the second arm proximal portion.

7. The connection of claim 6, wherein:
the second arm proximal portion in a direction extending orthogonally from the base has a shorter longitudinal extent than the second arm distal portion.

8. The connection of claim 6, wherein:
the second arm proximal portion in a direction extending parallel with the second edge has a portion that is wider than a portion of the second arm distal portion.

9. A connection between a hose reel and an anchoring support, the connection comprising:
 a. the anchoring support;
 b. an L-shaped mounting bracket attached to the anchoring support, the L-shaped mounting bracket having an extension flange and a mounting flange disposed at an angle to the extension flange with the mounting flange being connected to the anchoring support;
 c. a frame attached to the mounting bracket, the frame supporting the hose reel in a manner that allows the hose reel to rotate with respect to the frame; wherein
 d. the frame is channel-shaped, having a substantially planar base with first and second opposed, parallel edges, and first and second arms extending from the base in the same direction, the first arm being connected to the base at the first edge and the second arm being connected to the base at the second edge; and
 e. the frame receives the extension flange of the mounting bracket in a slot in the frame.

10. The connection of claim 9, wherein:
the slot in the frame extends along the second edge and is formed in a portion of the second arm.

11. A connection between a hose reel and an anchoring support, the connection comprising:
 a. the anchoring support;
 b. an L-shaped mounting bracket attached to the anchoring support, the L-shaped mounting bracket having an extension flange and a mounting flange disposed at an angle to the extension flange with the mounting flange being connected to the anchoring support;
 c. a frame attached to the mounting bracket, the frame supporting the hose reel in a manner that allows the hose reel to rotate with respect to the frame; wherein
 d. the frame is channel-shaped, having a substantially planar base with first and second opposed, parallel edges, and first and second arms extending from the base in the same direction, the first arm being connected to the base at the first edge and the second arm being connected to the base at the second edge;
 e. the second arm is formed with a substantially planar second arm proximal portion that is connected to the base at the second edge, and the longitudinal extent of the second arm proximal portion along the second edge is substantially equal to the longitudinal extent of the base along the second edge; and
 f. the mounting flange of the mounting bracket substantially interfaces with a portion of the second arm proximal portion and the longitudinal extent of the mounting flange in parallel with the second edge of the frame is substantially equal to the longitudinal extent of the second arm proximal portion along the second edge.

12. The connection of claim 11, wherein:
the second arm proximal portion is formed with one or more access openings that align with anchoring openings in the mounting flange of the mounting bracket.

13. The connection of claim 11, wherein:
the extension flange of the mounting bracket substantially interfaces with a portion of the base of the frame.

14. A connection between a hose reel and an anchoring support, the connection comprising:
 a. the anchoring support;
 b. an L-shaped mounting bracket attached to the anchoring support, the L-shaped mounting bracket having an extension flange and a mounting flange disposed at an angle to the extension flange with the mounting flange being connected to the anchoring support;
 c. a frame attached to the mounting bracket, the frame supporting the hose reel in a manner that allows the hose reel to rotate with respect to the frame; wherein
 d. a guide is attached to the frame, the guide has an opening that receives a hose that is attached to the hose reel, and the guide attached to the frame has an outer surface disposed away from the hose reel and a decorative plate is attached to the outer surface of the guide.

15. The connection of claim 1, wherein:
the mounting flange of the mounting bracket has extension legs that engage extension shoulders attached to the anchoring support.

16. The connection of claim 9, wherein:
the first arm is formed with a substantially planar first arm proximal portion that is connected to the base and a substantially planar first arm distal portion that is substantially parallel to the substantially planar first arm proximal portion, and a first arm inclined connection portion connects the first arm proximal portion to the first arm distal portion, with the first arm inclined connection portion being disposed at an angle to the first arm proximal portion and the first arm distal portion.

17. The connection of claim 16, wherein:
the first arm distal portion is disposed outwardly from the base of the frame in relation to the first arm proximal portion.

18. The connection of claim 17, wherein:
the first arm proximal portion in a direction extending orthogonally from the base has a longer longitudinal extent than the first arm distal portion.

19. The connection of claim 17, wherein:
the first arm proximal portion in a direction extending parallel with the first edge has a portion that is wider than the first arm distal portion.

20. The connection of claim 9, wherein:
the second arm is formed with a substantially planar second arm proximal portion that is connected to the base and a substantially planar second arm distal portion that is substantially parallel to the substantially planar second arm proximal portion, and a second arm inclined connection portion connects the second arm proximal portion to the second arm distal portion, with the second arm inclined connection portion being disposed at an angle to the second arm proximal portion and the second arm distal portion.

21. The connection of claim 20, wherein:
the second arm distal portion is disposed inwardly from the base of the frame in relation to the second arm proximal portion.

22. The connection of claim 21, wherein:
the second arm proximal portion in a direction extending orthogonally from the base has a shorter longitudinal extent than the second arm distal portion.

23. The connection of claim 21, wherein:
the second arm proximal portion in a direction extending parallel with the second edge has a portion that is wider than a portion of the second arm distal portion.

24. The connection of claim 9, wherein:
the second arm proximal portion is formed with one or more access openings that align with anchoring openings in the mounting flange of the mounting bracket.

25. The connection of claim 9, wherein:
the extension flange of the mounting bracket substantially interfaces with a portion of the base of the frame.

* * * * *